United States Patent
Mizuta

(10) Patent No.: US 9,338,577 B2
(45) Date of Patent: May 10, 2016

(54) GAME SYSTEM, GAME PROCESS CONTROL METHOD, GAME APPARATUS, AND COMPUTER-READABLE NON-TRANSITORY STORAGE MEDIUM HAVING STORED THEREIN GAME PROGRAM

(71) Applicant: NINTENDO CO., LTD., Kyoto (JP)

(72) Inventor: Masato Mizuta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 486 days.

(21) Appl. No.: 13/868,421

(22) Filed: Apr. 23, 2013

(65) Prior Publication Data
US 2014/0133681 A1    May 15, 2014

(30) Foreign Application Priority Data

Nov. 9, 2012   (JP) .................................. 2012-247504

(51) Int. Cl.
| | |
|---|---|
| *H04R 5/02* | (2006.01) |
| *H04S 7/00* | (2006.01) |
| *A63F 13/54* | (2014.01) |
| *A63F 13/57* | (2014.01) |

(52) U.S. Cl.
CPC ................. *H04S 7/303* (2013.01); *A63F 13/54* (2014.09); *A63F 13/57* (2014.09); *H04S 2400/11* (2013.01); *H04S 2400/13* (2013.01)

(58) Field of Classification Search
USPC ........... 381/1, 17, 18, 61, 300, 306, 307, 310; 463/25, 30, 32, 35, 42, 43; 700/94
See application file for complete search history.

(56) References Cited

U.S. PATENT DOCUMENTS

| | | | | |
|---|---|---|---|---|
| 9,041,735 | B2* | 5/2015 | Choi | ..................... G06F 3/0481 345/2.1 |
| 2004/0110561 | A1 | 6/2004 | Kawamura | |
| 2005/0281410 | A1* | 12/2005 | Grosvenor | ............. H04H 60/47 381/61 |
| 2007/0270226 | A1* | 11/2007 | York | ....................... A63F 13/00 463/43 |
| 2009/0282335 | A1* | 11/2009 | Alexandersson | . G06F 17/30749 715/716 |

FOREIGN PATENT DOCUMENTS

JP    2004-195210    7/2004

* cited by examiner

*Primary Examiner* — Vivian Chin
*Assistant Examiner* — Friedrich W Fahnert
(74) *Attorney, Agent, or Firm* — Nixon & Vanderhye P.C.

(57) ABSTRACT

Sounds are reproduced from a plurality of sound source objects at the same timing. A sound volume and a localization of each sound when the sounds are received by a virtual microphone are calculated. Any one sound source object is determined as a weight assignment target on the basis of the sound volumes. Then, when the sounds reproduced simultaneously from the sound source objects are outputted as a single sound, weight assignment is performed such that the localization of the sound of the sound source object determined as the weight assignment target is more greatly reflected, and a localization of an outputted sound on the basis of the localization of each sound source object. On the basis of this localization, an audio signal is generated and outputted.

25 Claims, 12 Drawing Sheets

F I G. 1 4
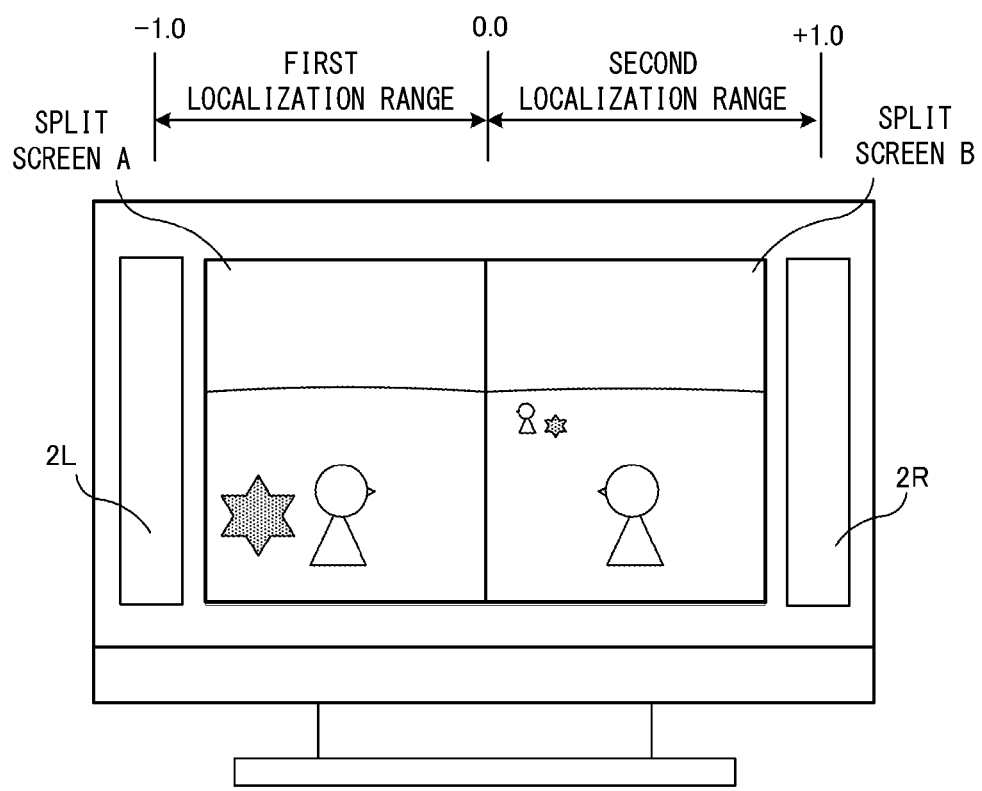

GAME SYSTEM, GAME PROCESS CONTROL METHOD, GAME APPARATUS, AND COMPUTER-READABLE NON-TRANSITORY STORAGE MEDIUM HAVING STORED THEREIN GAME PROGRAM

CROSS REFERENCE TO RELATED APPLICATION

The disclosure of Japanese Patent Application No. 2012-247504, filed on Nov. 9, 2012, is incorporated herein by reference.

FIELD

The exemplary embodiments disclosed herein relate to a game system, a game process control method, a game apparatus, and a computer-readable non-transitory storage medium having stored therein a game program, and more particularly relate to a game system, a game process control method, a game apparatus, and a computer-readable non-transitory storage medium having stored therein a game program, which include a sound output section for outputting a sound based on an audio signal and which represents a virtual three-dimensional space in which at least one virtual microphone and a plurality of sound source objects each associated with predetermined audio data are located.

BACKGROUND AND SUMMARY

Hitherto, in a game process or the like, a situation is represented in which sounds are emitted from a plurality of sound sources within a virtual space. In such sound representation, there could be a case where same sounds are emitted simultaneously from these sound sources. In such a case, when all the sounds are simultaneously reproduced, the volume of the sound outputted from a speaker or the like is excessively increased.

For the above problem, a technology is known in which when a plurality of sound objects of the same type are present, sounds emitted by these sound objects are combined into a single sound, thereby saving the sound sources. In this technology, when same sounds are simultaneously reproduced, the number of sounds is limited. As a result, the volume of the outputted sound is prevented from being excessively increased.

However, in the above technology, even though the sound sources to be used are saved, when the number of sound sources to be actually used exceeds the number of sound sources that can be used to emit sounds, sounds of sound objects that are not to be outputted are determined in accordance with "priority". In other words, due to the limitation on the number of sounds to be reproduced, there may be sounds that are not reproduced. For example, in the case where the number of usable sounds is limited to only one, when sounds from certain sound sources located on the right and left sides of a virtual microphone within a virtual space are simultaneously reproduced, there could be a situation in which only the sound from either the right sound source or the left sound source is actually reproduced.

Therefore, it is a feature of the exemplary embodiments to provide a game system, a game process control method, a game apparatus, and a computer-readable non-transitory storage medium having stored therein a game program, which prevent a sound volume from being excessively increased and enable sound reproduction in consideration of the position of each sound source, when sounds are emitted from a plurality of sound sources within a virtual space. It is noted that the computer-readable storage medium include, for example, magnetic media such as a flash memory, a ROM, and a RAM, and optical media such as a CD-ROM, a DVD-ROM, and a DVD-RAM.

The feature described above is attained by, for example, the following configuration.

A configuration example is a game system which includes a sound output section configured to output a sound based on an audio signal and which represents a virtual three-dimensional space in which at least one virtual microphone and a plurality of sound source objects each associated with predetermined audio data are located. The game system includes a sound reproduction section, a received sound volume calculator, a first localization calculator, a weight assignment target determination section, a second localization calculator, and a sound output controller. The sound reproduction section is configured to reproduce a sound based on the predetermined audio data associated with each of the plurality of sound source objects, at a position of each sound source object in the virtual three-dimensional space and at the same timing. The received sound volume calculator is configured to calculate, for each sound source object, a magnitude of a sound volume of the sound of each sound source object, reproduced by the sound reproduction section, at the virtual microphone when each sound is received by the virtual microphone. The first localization calculator is configured to calculate, for each sound source object, a localization of the sound of each sound source object, reproduced by the sound reproduction section, at the virtual microphone as a first localization when each sound is received by the virtual microphone. The weight assignment target determination section is configured to determine any one sound source object as a weight assignment target on the basis of the magnitude of the sound volume of the sound of each sound source object which is calculated by the received sound volume calculator. The second localization calculator is configured to perform weight assignment such that the localization of the sound of the sound source object determined by the weight assignment target determination section is more greatly reflected and to calculate a second localization on the basis of the first localization of each sound source object when the sounds of the sound source objects are outputted as a single sound. The sound output controller is configured to generate, on the basis of the second localization, an audio signal in which the sounds of the plurality of sound source objects are made into a single sound, and to output the audio signal to the sound output section.

According to the above configuration example, it is possible to prevent a sound volume from being unexpectedly great due to predetermined sounds from a plurality of sound sources being simultaneously reproduced. In addition, it is possible to perform such sound reproduction that the positional relation of each sound source is reflected.

Additionally, the predetermined audio data associated with the plurality of sound source objects may be the same.

According to the above configuration example, it is possible to prevent a sound volume from being unexpectedly great due to same sounds from a plurality of sound sources being simultaneously reproduced.

Additionally, the weight assignment target determination section may determine, as the weight assignment target, the sound source object having the greatest magnitude of the sound volume of the reproduced sound which is calculated by the received sound volume calculator.

According to the above configuration example, it is possible to perform such sound reproduction that the positional relation of each sound source is reflected further.

Additionally, the game system may further include an output sound volume setter configured to set a sound volume of a sound to be outputted to the sound output section, on the basis of the sound source objects that have emitted the sounds at the same timing. The sound output controller may output a sound based on the audio signal with the sound volume set by the output sound volume setter. Moreover, the output sound volume setter may set, as the sound volume of the sound to be outputted to the sound output section, the greatest sound volume among the sound volume of the sound of each sound source object which is calculated by the received sound volume calculator, or may set the sound volume of the sound to be outputted to the sound output section, on the basis of the number of the sound source objects that have emitted the sounds at the same timing. Furthermore, the output sound volume setter may set the sound volume of the sound to be outputted, such that the sound volume is increased as the number of the sound source objects that have emitted the sounds at the same timing is increased.

According to the above configuration example, it is possible to perform such sound reproduction that the positional relation of each sound source is reflected further. In particular, it is possible to perform sound representation that allows a sense of distance to each sound source object to be easily grasped.

Additionally, the game system may further include an outputted sound changing section configured to change a content of a sound to be outputted to the sound output section, on the basis of the number of the sound source objects that have emitted the sounds at the same timing.

According to the above configuration example, for example, in a game process in which an enemy character is eliminated, it is possible to provide an aurally exhilarating feeling to a player when the player eliminates multiple enemy characters at one time.

Additionally, the sound output section may be a stereo speaker, and each of the first localization calculator and the second localization calculator may calculate a localization in a right-left direction when a player facing the sound output section sees the sound output section. Furthermore, the sound output section may be a surround speaker, and each of the first localization calculator and the second localization calculator may calculate a localization in a right-left direction and a localization in a forward-rearward direction when a player facing the sound output section sees the sound output section.

According to the above configuration example, it is possible to cause a player to aurally feel expansion of the virtual three-dimensional space.

Additionally, a plurality of virtual microphones may be located in the virtual three-dimensional space, the received sound volume calculator may calculate the magnitude of the sound volume of the sound of each sound source object for each of the plurality of virtual microphones, the first localization calculator may calculate the first localization of each sound source object for each of the plurality of virtual microphones, the weight assignment target determination section may determine the weight assignment target for each of the plurality of virtual microphones, the second localization calculator may calculate the second localization for each of the plurality of virtual microphones, the game system may further include a third localization calculator configured to calculate a localization with which the sounds received by each virtual microphone are to be outputted as a single sound, as a third localization on the basis of the second localization at each of the plurality of virtual microphones, and the sound output controller may generate an audio signal regarding the sound source objects on the basis of the third localization and may output the audio signal to the sound output section.

According to the above configuration example, in a game process of a game that is played simultaneously by a plurality of players and in which, for example, a screen is split and split screens are assigned to the players, it is possible to aurally provide a spatial sense of the virtual three-dimensional space to each player.

Another configuration example is a game system which includes a sound output section configured to output a sound based on an audio signal and which represents a virtual three-dimensional space in which a plurality of virtual microphones and a plurality of sound source objects each associated with predetermined audio data are located. The game system includes a sound reproduction section, a received sound volume calculator, a first localization calculator, a second localization calculator, a third localization calculator, and a sound output controller. The sound reproduction section is configured to reproduce a sound based on the predetermined audio data associated with each sound source object, at a position of each sound source object in the virtual three-dimensional space and at the same timing. The received sound volume calculator is configured to calculate, for each of the plurality of virtual microphones, a magnitude of a sound volume of each of a plurality of the sounds, reproduced by the sound reproduction section, at each virtual microphone when the sounds are received by each virtual microphone. The first localization calculator is configured to calculate, for each of the plurality of virtual microphones, a localization of each of the sounds, reproduced by the sound reproduction section, as a first localization when the sounds are received by each virtual microphone. The second localization calculator is configured to calculate, for each of the plurality of sound source objects, a second localization on the basis of the magnitude of the sound volume of the sound of each sound source object at each virtual microphone which is calculated by the received sound volume calculator and the localization of each sound source object at each virtual microphone which is calculated by the first localization calculator, the second localization being a localization with which the sounds received by the plurality of virtual microphones are to be outputted as a single sound. The third localization calculator is configured to calculate a third localization on the basis of the second localization regarding each of the plurality of sound source objects, the third localization being a localization with which the sounds of the plurality of sound source objects which are reproduced at the same timing are to be outputted as a single sound. The sound output controller is configured to generate an audio signal regarding the sounds of the plurality of sound source objects which are reproduced at the same timing, on the basis of the third localization and to output the audio signal to the sound output section.

According to the above configuration example, in a game process of a game that is played simultaneously by a plurality of players and in which, for example, a screen is split and split screens are assigned to the players, it is possible to aurally provide a spatial sense of the virtual three-dimensional space to each player.

According to the exemplary embodiments, it is possible to prevent a sound volume from being unexpectedly great due to overlapping of sounds from a plurality of sound sources which are simultaneously reproduced. In addition, it is possible to perform such sound reproduction that the positional relation of each sound source is reflected.

BRIEF DESCRIPTION OF THE DRAWINGS

FIG. 14 is a diagram showing a non-limiting example of a localization range;

DETAILED DESCRIPTION OF NON-LIMITING EXAMPLE EMBODIMENTS (First Embodiment)

A game system according to a first embodiment will be described with reference to FIG. 1.

Figure 1:
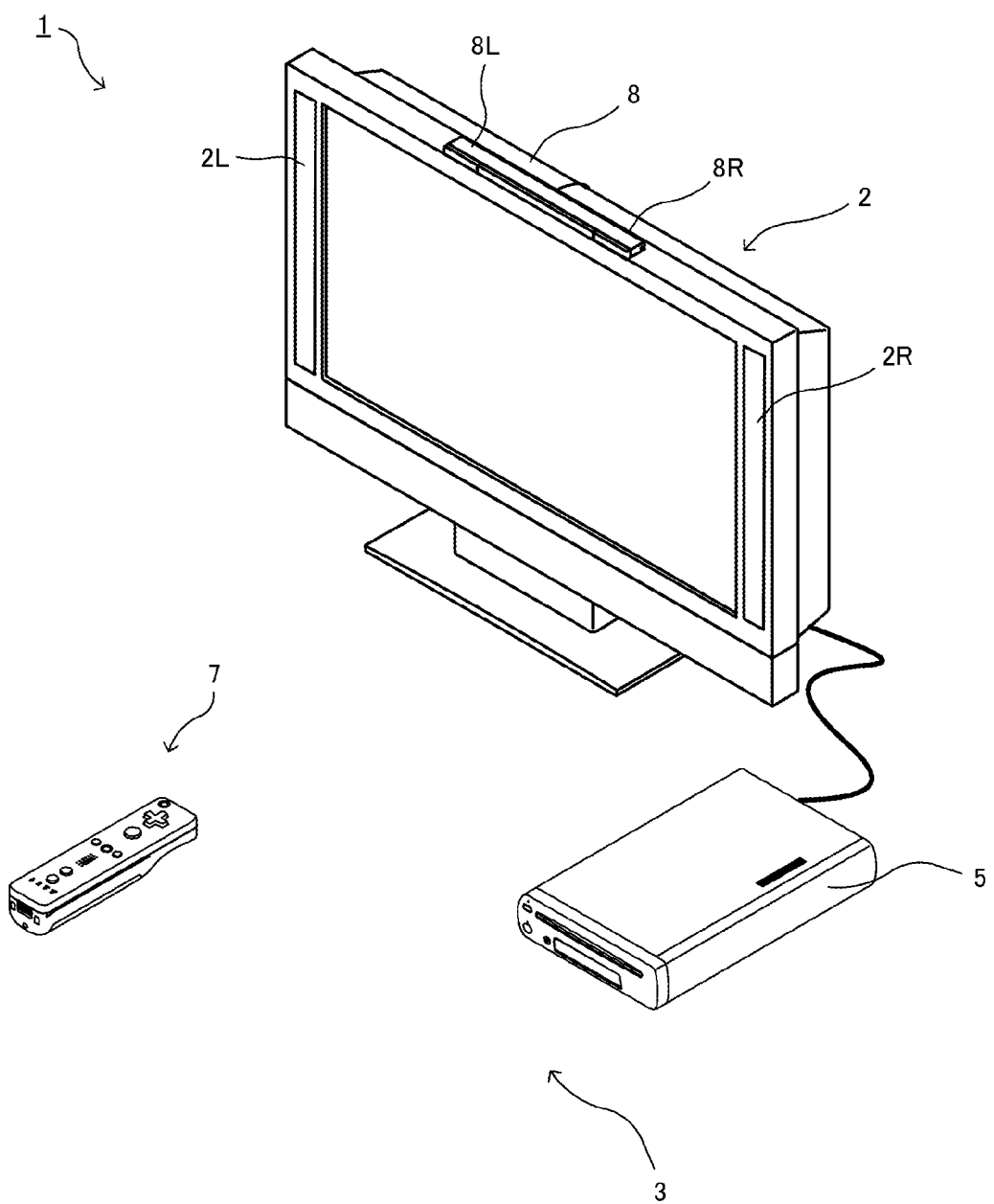
FIG. 1 is an external view showing a non-limiting example of a game system 1 according to one embodiment.

In FIG. 1, a game system 1 includes a household television receiver (hereinafter, referred to as monitor) 2, which is an example of a display section, and a stationary game apparatus 3 connected to the monitor 2 via a connection cord. In addition, the game apparatus 3 includes a game apparatus body 5, a controller 7, and a marker section 8.

The monitor 2 displays game images outputted from the game apparatus body 5. The monitor 2 includes speakers 2L and 2R that are stereo speakers. The speakers 2L and 2R output game sounds outputted from the game apparatus body 5. Although the monitor 2 includes these speakers in the embodiment, an external speaker may be additionally connectable to the monitor 2 in another embodiment. In addition, the marker section 8 is provided in the vicinity of the screen of the monitor 2 (on the upper side of the screen in FIG. 1). The marker section 8 includes two markers 8R and 8L at both ends thereof. Specifically, the marker 8R is composed of one or more infrared LEDs and outputs infrared light forward from the monitor 2 (the same applies to the marker 8L). The marker section 8 is connected to the game apparatus body 5, and the game apparatus body 5 is able to control each LED of the marker section 8 to be on or off.

The game apparatus body 5 performs a game process or the like on the basis of a game program or the like stored in an optical disc that is readable by the game apparatus body 5.

The controller 7 provides, to the game apparatus body 5, operation data representing the content of an operation performed on the controller 7. The controller 7 and the game apparatus body 5 are connected via wireless communication.

Figure 2:
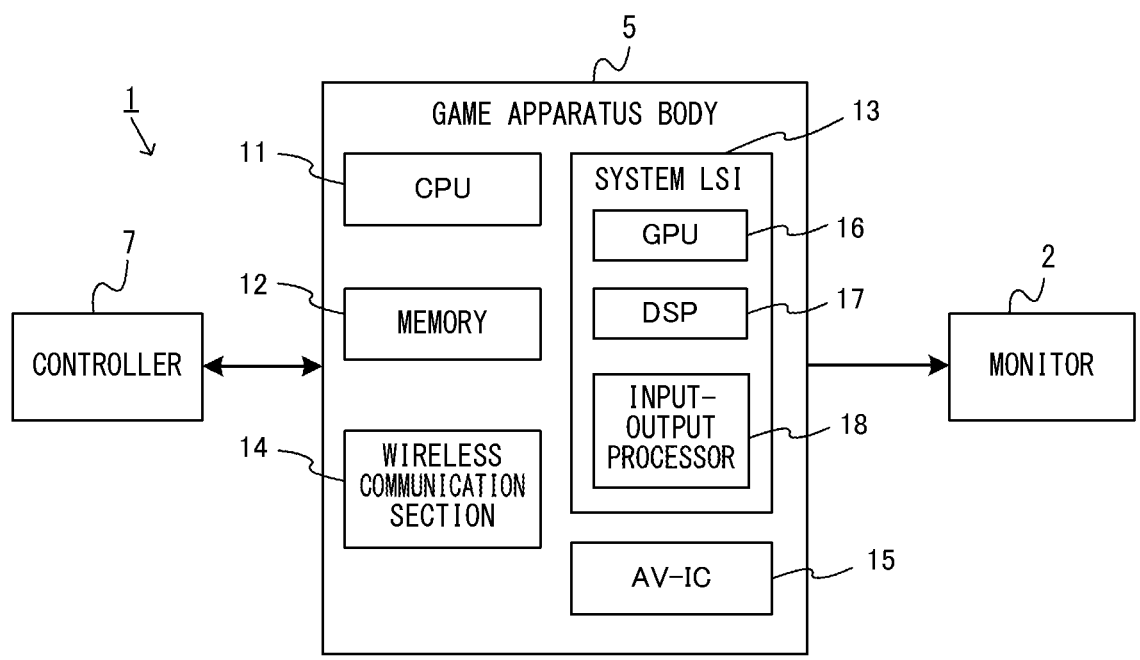
FIG. 2 is a function block diagram showing a non-limiting example of a game apparatus body 5 in FIG. 1.

FIG. 2 is a block diagram of the game apparatus body 5. In FIG. 2, the game apparatus body 5 is an example of an information processing apparatus. In the present embodiment, the game apparatus body 5 includes a CPU (control section) 11, a memory 12, a system LSI 13, a wireless communication section 14, an AV-IC (Audio Video-Integrated Circuit) 15, and the like.

The CPU 11 executes a predetermined information processing program using the memory 12, the system LSI 13, and the like. By so doing, various functions (e.g., a game process) in the game apparatus 3 are realized.

The system LSI 13 includes GPU (Graphics Processor Unit) 16, a DSP (Digital Signal Processor) 17, an input-output processor 18, and the like.

The GPU 16 generates an image in accordance with a graphics command (image generation command) from the CPU 11.

The DSP 17 functions as an audio processor and generates audio data by using sound data and sound waveform (tone) data stored in the memory 12.

The input-output processor 18 performs transmission and reception of data to and from the controllers 7 via the wireless communication section 14. In addition, the input-output processor 18 receives, via the wireless communication section 14, operation data and the like transmitted from the controllers 7, and stores (temporarily) the operation data and the like in a buffer area of the memory 12.

Image data and audio data generated in the game apparatus body 5 are read by the AV-IC 15. The AV-IC 15 outputs the read image data to the monitor 2 via an AV connector (not shown), and outputs the read audio data to the speakers 2L and 2R of the monitor 2 via the AV connector. By so doing, an image is displayed on the monitor 2, and sound is outputted from the speakers 2L and 2R.

Figure 3:
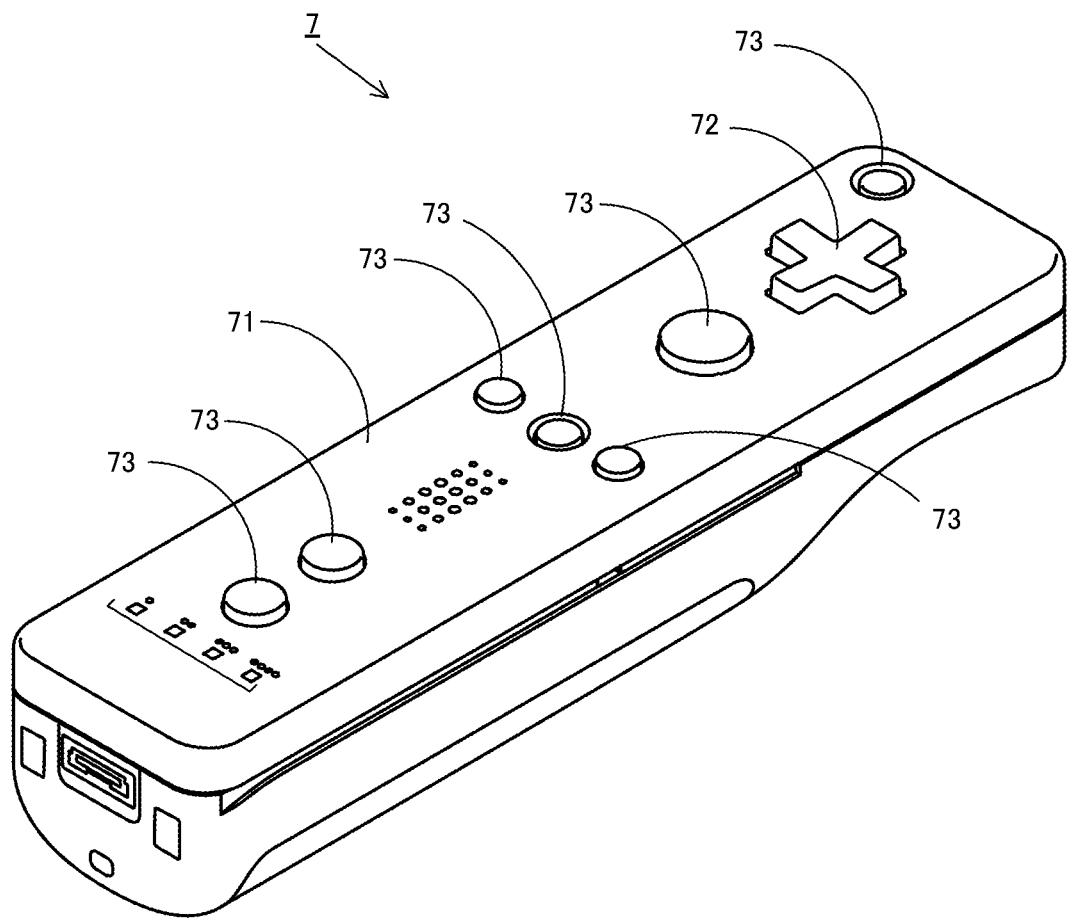
FIG. 3 is a diagram showing a non-limiting example of the external configuration of a controller 7 in FIG. 1.

FIG. 3 is a perspective view showing the external configuration of the controller 7. In FIG. 3, the controller 7 includes a housing 71 formed, for example, by plastic molding. In addition, the controller 7 includes a cross key 72, a plurality of operation buttons 73, and the like as an operation section (an operation section 31 shown in FIG. 4). The controller 7 also includes a motion sensor. A player can perform game operations by pressing each button provided in the controller 7 and moving the controller 7 to change its position and/or attitude.

Figure 4:
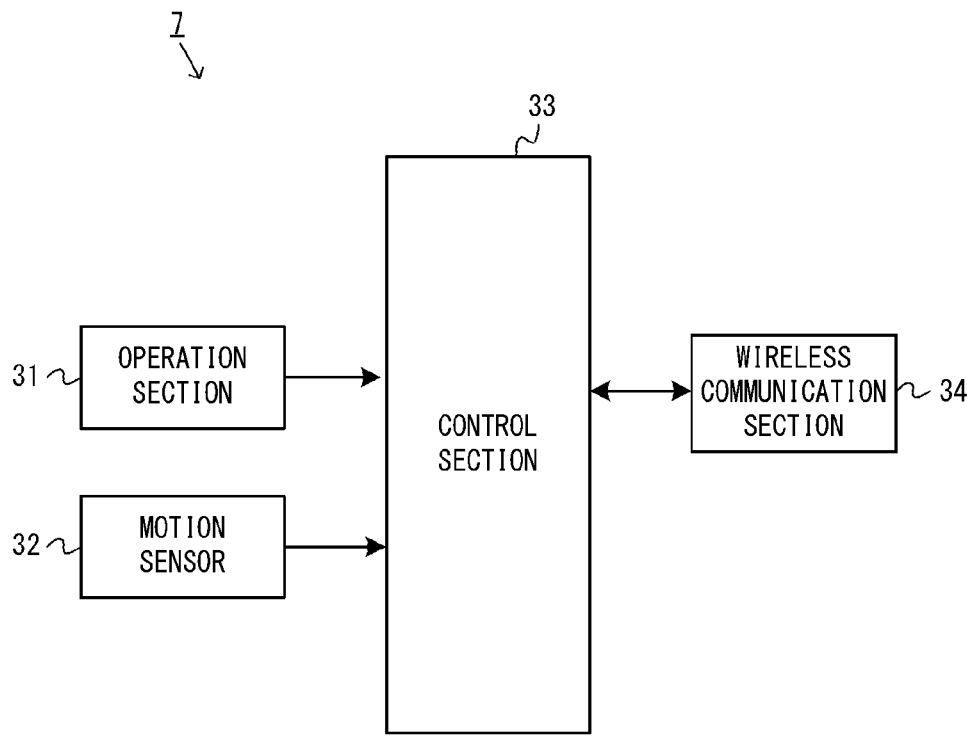
FIG. 4 is a block diagram showing a non-limiting example of the internal configuration of the controller 7.

FIG. 4 is a block diagram showing the electrical configuration of the controller 7. As shown in FIG. 4, the controller 7 includes the above-described operation section 31. In addition, the controller 7 includes the motion sensor 32 for detecting the attitude of the controller 7. In the present embodiment, an acceleration sensor and a gyro-sensor are provided as the motion sensor 32. The acceleration sensor is able to detect acceleration in three axes, namely, an x-axis, a y-axis, and a z-axis. The gyro-sensor is able to detect angular velocities about the three axes, namely, the x-axis, the y-axis, and the z-axis.

In addition, the controller 7 includes a wireless communication section 34 which is able to perform wireless communication with the game apparatus body 5. In the present embodiment, wireless communication is performed between the controller 7 and the game apparatus body 5. However, communication may be performed therebetween via a wire in another embodiment.

Moreover, the controller 7 includes a control section 33 which controls an operation of the controller 7. Specifically, the control section 33 receives output data from each input section (the operation section 31 and the motion sensor 32)

and transmits the output data as operation data to the game apparatus body 5 via the wireless communication section 34.

Next, an outline of a process performed by the system according to the first embodiment will be described with reference to FIG. 5.

In the first embodiment, a game process of a game that allows a player character to freely move around in a virtual three-dimensional space (hereinafter, referred to merely as virtual space), is assumed. In the present embodiment, as an example, a case will be described in which a process of receiving, with a single virtual microphone, sounds from a plurality of sound source objects present within the virtual space (a process of performing sound field calculation (sound volume and localization) in which the sound is regarded as being heard through the virtual microphone) is performed and an audio signal resulting from this process is outputted from the speakers 2L and 2R. It is noted that in the present embodiment, as this sound, a sound such as a sound effect is assumed. In other words, as this sound, a continuously reproduced sound such as BGM (continuous sound) is not assumed, and a one-shot sound, namely, a sound that ends in a very short time (a sound that is reproduced for a short time period), is assumed. In the present embodiment, as an example, a situation will be described in which there are three sound source objects and same one-shot sounds are emitted from these sound source objects.

Figure 5:
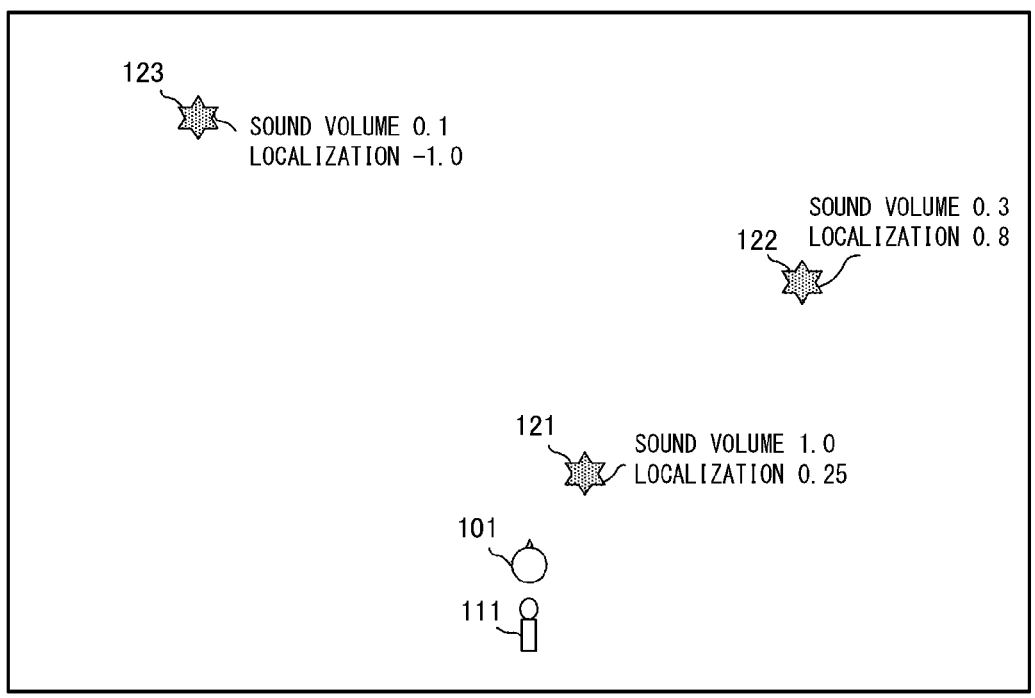
FIG. 5 is a diagram showing a positional relation of each object within a virtual space in a first embodiment.

FIG. 5 is a schematic diagram showing an example of the virtual space in the above situation. FIG. 5 shows a bird's-eye view of the virtual space. In FIG. 5, a player object 101 is present, and a virtual microphone 111 is located behind the player object 101. In addition, a first sound source object 121 is located at a position diagonally forward right of the player object 101. A second sound source object 122 is also located at a position diagonally forward right of the player object 101 and is farther from the player object 101 than the first sound source object 121. Moreover, a third sound source object 123 is located at a position diagonally forward left of the player object 101 and is farther from the player object 101 than the second sound source object 122.

It is assumed that the same sound effect is emitted from each sound source object simultaneously (in the same game frame) in such a situation. In this case, for example, it is assumed that a sound volume and a localization of each sound source object heard at the position of the virtual microphone 111 have the following relationship. It is noted that a sound volume range is 0.0 to 1.0, and a localization range is −1.0 to 1.0 (the localization is a localization in an x-axis direction in a local coordinate system for the virtual microphone). In addition, with regard to localization, at −1.0, it is in a state where sound is heard only from the speaker 2L (a state where the sound volume balance is biased left). At +1.0, it is in a state where sound is heard only from the speaker 2R (a state where the sound volume balance is biased right). At 0.0, it is in a state where sound is heard from the center (the right and left sound volumes are equally balanced).

On the assumption of the above-described localization, in FIG. 5, it is assumed that the first sound source object 121 is heard with a sound volume of 1.0 and a localization of 0.25; the second sound source object 122 is heard with a sound volume of 0.3 and a localization of 0.8; and the third sound source object 123 is heard with a sound volume of 0.1 and a localization of −1.0. In the following description, for convenience of explanation, the volume of a sound received by the above virtual microphone is referred to as "received sound volume". In addition, a localization at the virtual microphone is referred to as "received sound localization".

In the case of the above-described relationship, in the present embodiment, simultaneously-outputted sounds from the three sound sources are outputted as a single sound (in other words, the three sound sources are handled as a single sound source). In the following description, the single sound is referred to as "combined sound". In the present embodiment, in outputting a combined sound, importance is placed on the sound source having the greatest magnitude of the received sound volume at the virtual microphone, and a sound volume and a localization of the combined sound to be finally outputted from the speaker are determined. Specifically, with regard to the sound volume, the greatest received sound volume among the above three received sound volumes is used. In the above example, the sound volume of "1.0" of the first sound source object 121 is set as the sound volume of the combined sound. In addition, with regard to the localization, such a localization that importance is placed on the received sound localization of the sound source having the greatest sound volume among the above three received sound volumes, is calculated. For example, in the case of the above three sound source objects, the localization of the combined sound is calculated by using the following formula 1.

[Math. 1]

$$\frac{(RSV1 \times RSL1) + (RSV2 \times RSL2) + (RSV3 \times RSL3)}{RSV1 + RSV2 + RSV3} \quad \text{formula 1}$$

RSV (received sound volume) n and RSL (received sound localization) n denote the received sound volume and the received sound localization of the nth sound source object (in the above example, any of the first to third sound objects).

As described above, in the present embodiment, when same sounds are emitted simultaneously from a plurality of sound sources, the sounds from these sound sources are outputted as such a single sound that the sound volume and the localization of the sound source object whose sound is received as the loudest sound are more greatly reflected. By so doing, it is possible to prevent a sound volume from being unexpectedly great due to simultaneous reproduction of the same sounds from a plurality of sound sources. In addition, it is possible to perform such sound reproduction that the positional relation of each sound source is reflected. Furthermore, the same sounds emitted simultaneously from a plurality of sound sources are (combined and) outputted as a single sound that is a representative of these sounds. Thus, it is unnecessary to individually perform a sound reproduction/output process for each sound source, and it is also possible to reduce a processing load for sound reproduction.

Next, an operation of the system 1 for realizing the above-described game process will be described in detail with reference to FIGS. 6 to 11.

Figure 6:
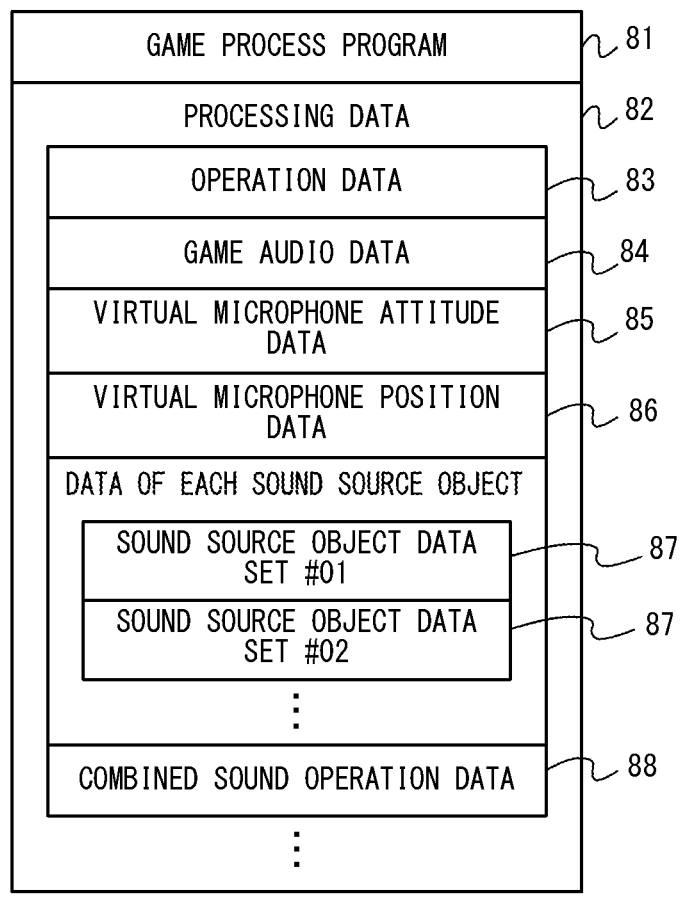
FIG. 6 shows a memory map of a memory 12.

FIG. 6 shows an example of various data stored in the memory 12 of the game apparatus body 5 when the above-described game process is performed.

A game process program 81 is a program for causing the CPU 11 of the game apparatus body 5 to perform the game process for realizing the above-described game. The game process program 81 is, for example, loaded from an optical disc into the memory 12.

Processing data 82 is data used in the game process performed by the CPU 11. The processing data 82 includes operation data 83, game audio data 84, virtual microphone attitude data 85, virtual microphone position data 86, a plurality of sound source object data sets 87, and combined sound operation data 88. In addition, data representing the attitude of a virtual camera, data of a player character, and data of various other objects are also included, but omitted in the drawing.

The operation data 83 is operation data transmitted periodically from the controller 7. The operation data 83 includes data representing a state of an input on the operation section 31 and data representing the content of an input on the motion sensor 32.

The game audio data 84 is data on which a game sound emitted by each sound source object is based. The game audio data 84 includes sound effects and music data sets that are associated with each sound source object. In addition, the game audio data 84 also includes various sound effects and music data sets that are not associated with any sound source object.

The virtual microphone attitude data 85 is data representing the attitude of the virtual microphone 111. The attitude of the virtual microphone is changed as appropriate on the basis of a moving operation or the like for the player character. In the present embodiment, the attitude (particularly, the direction) of the virtual microphone is controlled so as to coincide with the attitude (direction) of the virtual camera.

The virtual microphone position data 86 is data representing the position of the virtual microphone 111 within the virtual space. The position of the virtual microphone is changed as appropriate in accordance with movement or the like of the player character.

Figure 7:
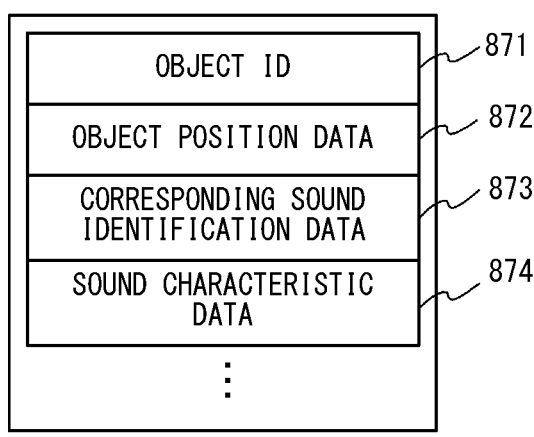
FIG. 7 shows a non-limiting example of the configuration of a sound source object data set 87.

Each sound source object data set 87 is a data set regarding each sound source object. FIG. 7 is a diagram showing an example of the configuration of each sound source object data set 87. The sound source object data set 87 includes an object ID 871, object position data 872, corresponding sound identification data 873, sound characteristic data 874, and the like.

The object ID 871 is an ID for identifying each sound source object. The object position data 872 is data representing the position of the sound source object within the virtual space. The corresponding sound identification data 873 is data indicating the game audio data 84 that is defined as a sound emitted by the sound source object. The sound characteristic data 874 is data that defines, for example, the loudness (sound volume) of the sound emitted by the sound source object and the distance which the sound reaches within the virtual space. The sound characteristic data 874 also includes information indicating presence/absence of another sound source object that is defined to emit the same sound as that of the sound source. This information indicates whether the sound source object can be a target for the above-described combined sound. For example, it is conceived that a group number is previously defined for a sound effect that can be a combined sound and the sound characteristic data 874 includes the group number. By so doing, it is possible to determine that among sound source objects that have emitted sounds in the same game frame, sound source objects having the same group number become targets of a process of generating a combined sound. In addition, the sound source object data set 87 also includes a flag for indicating whether or not the sound source object is currently emitting the sound, and the like.

Figure 8:
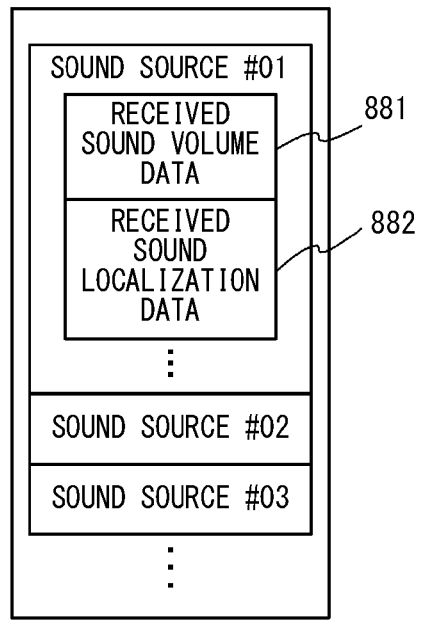
FIG. 8 shows a non-limiting example of the configuration of combined sound operation data 88.

Referring back to FIG. 6, the combined sound operation data 88 is data used for generating the above-described combined sound. FIG. 8 is a diagram showing an example of the configuration of the combined sound operation data 88. In FIG. 8, in the combined sound operation data 88, received sound volume data 881 representing the received sound volume at the virtual microphone 111 and received sound localization data 882 representing the received sound localization at the virtual microphone 111 are stored for each of a plurality of objects (shown as sound source #n in FIG. 8).

Next, flow of the game process performed by the CPU 11 of the game apparatus body 5 on the basis of the game process program 81 will be described with reference to a flowchart of FIG. 9. It is noted that here, the above-described process regarding sound output control when sounds from a plurality of sound source objects are received by a single virtual microphone will be mainly described, and the description of the other processes is omitted. In addition, the flowchart of FIG. 9 is repeatedly executed on a frame-by-frame basis.

Figure 9:
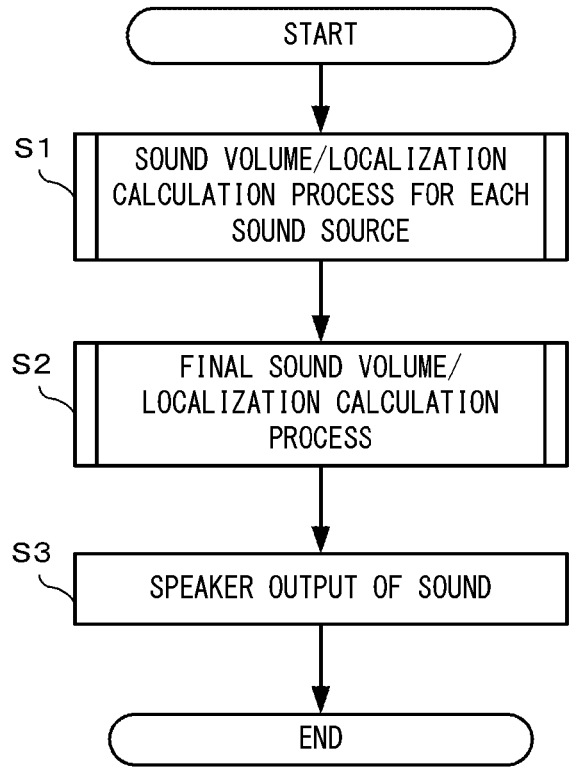
FIG. 9 is a flowchart showing flow of a game process based on a game process program 81.
Figure 10:
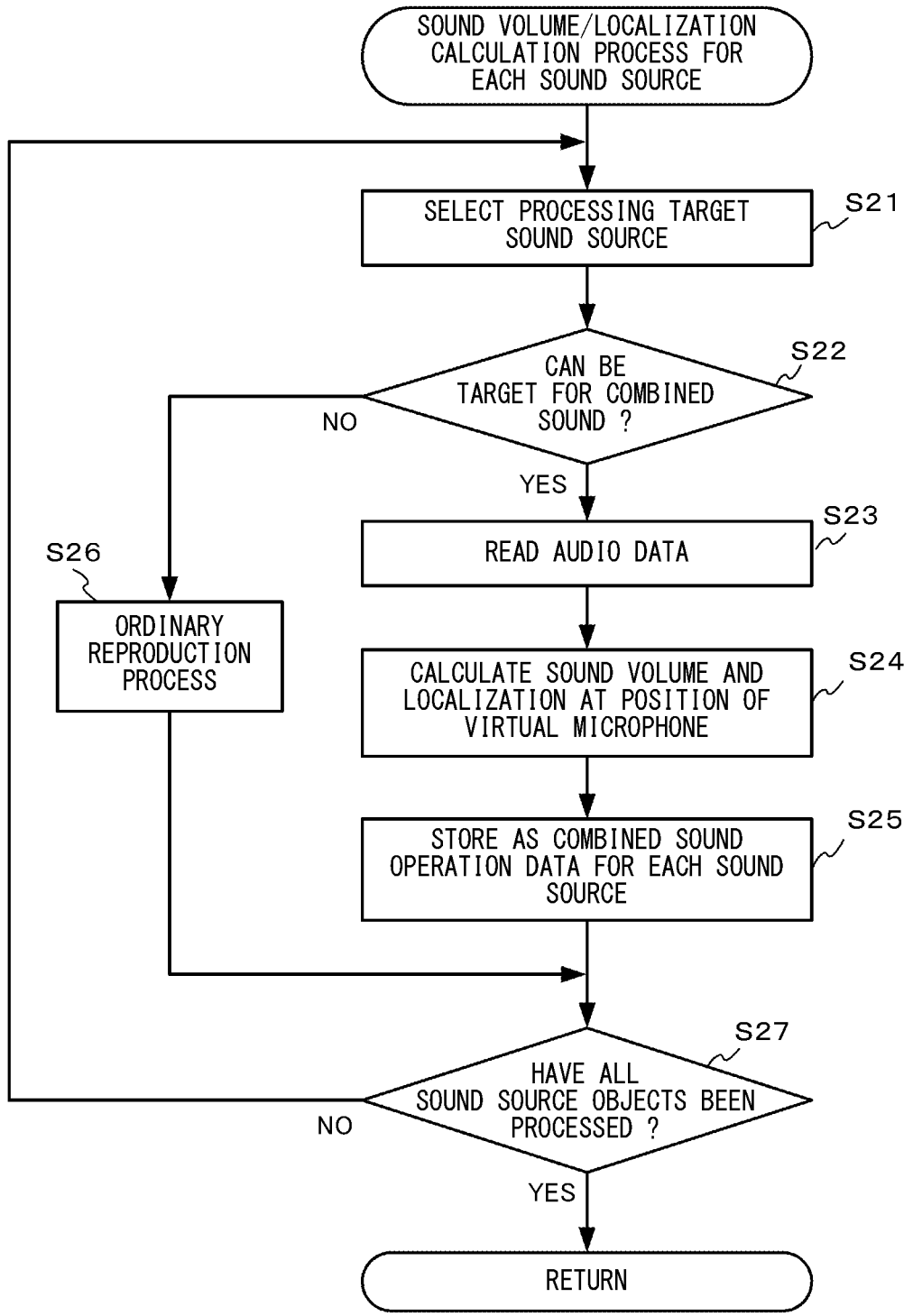
FIG. 10 is a flowchart showing in detail a sound volume/localization calculation process for each sound source shown in step S1 in FIG. 9.

In FIG. 9, first, in step S1, the CPU 11 performs a sound volume/localization calculation process for each sound source. The process is a process for calculating a received sound volume and a received sound localization when a sound from each sound source object within the virtual space is received by the virtual microphone. FIG. 10 is a flowchart showing in detail the sound volume/localization calculation process for each sound source. In FIG. 10, first, in step S21, the CPU 11 extracts sound source objects that are determined to output sounds in the current process loop (game frame), from a plurality of sound source objects present within the virtual space. Then, the CPU 11 selects one sound source object as a processing target from among the extracted sound source objects. Hereinafter, the selected sound source object is referred to as processing target sound source.

Next, in step S22, the CPU 11 determines whether or not the sound emitted by the processing target sound source can be a target of reproduction as a combined sound. Specifically, the CPU 11 refers to the sound characteristic data 874 and determines whether or not the sound of the processing target sound source is a sound that is previously defined as a sound that can be a target for a combined sound. As a result of the determination, when the sound can be a target for a combined sound (YES in step S22), the CPU 11 subsequently performs, in step S23, a process of reading the game audio data 84 associated with the processing target sound source.

Next, in step S24, on the basis of the position and the sound characteristic data 874 of the processing target sound source and the position and the direction of the virtual microphone 111, the CPU 11 calculates a received sound volume and a received sound localization at the virtual microphone when a sound based on the read game audio data is emitted. Next, in step S25, the CPU 11 stores the calculated received sound volume and received sound localization as the combined sound operation data 88 in the memory 12. Then, the processing proceeds to step S28 described later.

On the other hand, as a result of the determination in step S22, when the sound of the processing target sound source does not become a target of reproduction as a combined sound (NO in step S22), the CPU 11 performs an ordinary sound reproduction process in step S26. Specifically, the CPU 11 performs a process of reproducing a predetermined sound associated with the processing target sound source, at the position of the processing target sound source. In other words, for a sound that cannot be a target of reproduction as a combined sound, a reproduction process is performed through this process (a sound that can be a target of reproduction as a combined sound is reproduced in a process in step S2 described later.)

Next, in step S27, the CPU 11 determines whether or not the above-described process has been performed for all the sound source objects that are determined to output sounds in the current process loop. As a result, when unprocessed sound source objects remain (NO in step S27), the CPU 11 returns to step S21 and repeats the same process. When all the sound source objects have been processed (YES in step S27), the sound volume/localization calculation process for each sound source is ended.

Figure 11:
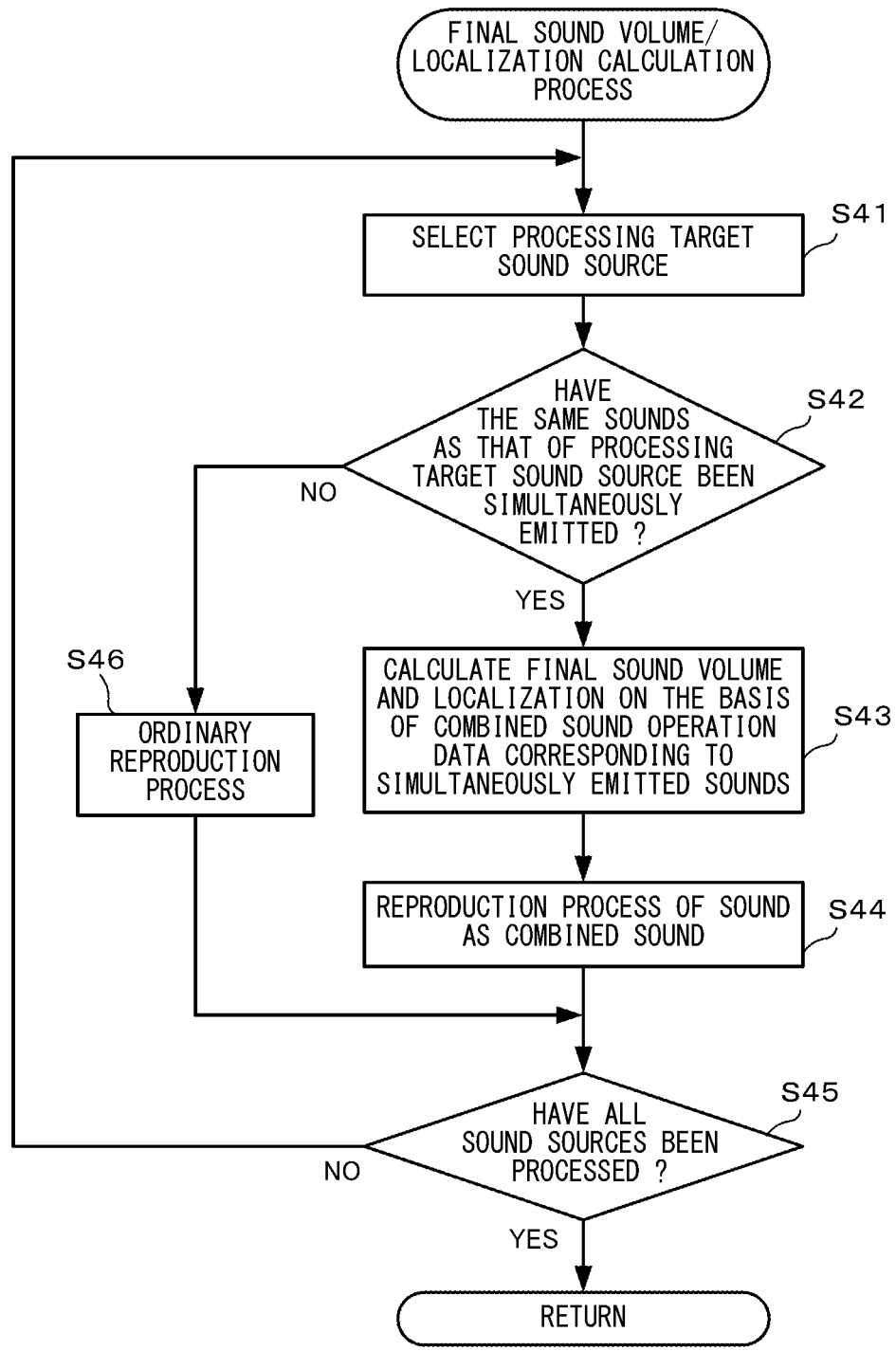
FIG. 11 is a flowchart showing in detail a final sound volume/localization calculation process shown in step S2 in FIG. 9.

Referring back to FIG. 9, next, in step S2, the CPU 11 performs a final sound volume/localization calculation process. The process is a process that targets sound source objects whose sounds can be targets of reproduction as a combined sound (both the case where a plurality of sounds have been emitted and the case where only one sound has been actually emitted are included). Particularly, in the process, with regard to a sound to be outputted as a combined sound, a sound volume and a localization of a final output sound that is a sound to be outputted to the speaker are calculated on the basis of the received sound volume and the received sound localization of each sound source which are calculated in step S1. FIG. 11 is a flowchart showing in detail the final sound volume/localization calculation process. First, in step S41, the CPU 11 selects a sound source object as a target of the process below (a processing target sound source) from among the sound source objects whose sounds can be targets of reproduction as a combined sound.

Next, in step S42, the CPU 11 determines whether or not a plurality of sounds that are the same as the sound of the processing target sound source have been simultaneously emitted. In other words, the CPU 11 determines whether or not the sound of the processing target sound source is a sound handled as a combined sound. As a result, when the sound is not a sound handled as a combined sound (NO in step S42), the CPU 11 performs an ordinary reproduction process (i.e., a process that does no use the above formula 1) for the sound of the processing target sound source in step S46. In other words, when the sound can be a target for a "combined sound" but only a single sound has been actually emitted, sound reproduction is performed through this process. Then, the processing proceeds to step S45 described later.

On the other hand, when a plurality of the same sounds have been emitted (YES in step S42), the CPU 11, in step S43, refers to the combined sound operation data 88 corresponding to each of the plurality of simultaneously emitted sounds, and calculates a final output sound volume and localization. In other words, with regard to the sound volume, the CPU 11 refers to the received sound volume data 881 corresponding to each of the simultaneously emitted sounds, namely, corresponding to each of the sound sources whose sounds can be targets for a combined sound, and uses the received sound volume of the sound source object having the greatest received sound volume. In addition, with regard to the localization, the CPU 11 refers to the received sound volume data 881 and the received sound localization data 882 of each sound source whose sound can be a target for a combined sound, and calculates the localization by using the above formula 1.

Next, in step S44, the CPU 11 performs a process of generating and reproducing an output sound as a combined sound. In other words, the CPU 11 generates and reproduces a sound as a combined sound by using the sound volume and the localization calculated in step S43.

Next, in step S45, the CPU 11 determines whether or not all the sounds to be outputted in the current game frame have been processed. When unprocessed sounds remain (NO in step S45), the CPU 11 returns to step S41 and repeats the same process. When all the sounds have been processed (YES in (step S45), the final sound volume/localization calculation process is ended.

It is noted that the processes in steps S42 and S46 may be omitted. This is because, regardless of whether or not a plurality of sounds have been actually emitted, it is possible to obtain the same calculation result when all the sounds that can be a combined sound are processed.

Referring back to FIG. 9, next, in step S3, the CPU 11 performs a process of blending each sound calculated in step S2 to generate an audio signal, and outputting the audio signal to the speaker or the like.

This is the end of the process regarding sound output control according to the first embodiment.

As described above, in the first embodiment, when sounds from a plurality of sound source objects are received by a single virtual microphone and outputted as a single sound, the sounds are combined into a single sound such that importance is placed on the sound volume and the localization of the sound from the sound source object whose sound is received as a louder sound. By so doing, a sound volume is prevented from being unexpectedly great due to simultaneous reproduction of the same sounds, and it is also possible to perform sound reproduction in consideration of the position of each sound source.

With regard to the determination of the sound volume, the received sound volume regarding the sound source object having the greatest received sound volume is used in the above embodiment. Alternatively, for example, the sound volume may be changed according to the number of sound source objects that have simultaneously emitted the same sounds. For example, the sound volume of the sound emitted by a certain sound source object may be set as an initial value, and when the number of sound source objects is two, the sound volume may be multiplied by 1.1, or when the number of sound source objects is three, the sound volume may be multiplied by 1.2.

Still alternatively, the sound to be outputted may be changed according to the number of sound source objects that have simultaneously emitted the same sounds. For example, a plurality of audio data sets are prepared as a sound effect that is emitted in a certain scene. As an example, as a sound effect that is emitted when an enemy character is eliminated, a first sound effect to be emitted when only one enemy character is eliminated and a second sound effect to be emitted when five or more enemy character are eliminated at one time are prepared. The second sound effect is a sound that is based on the first sound effect but is arranged so as to be heard as a louder sound. A plurality of sound effects are prepared as described above, and sound output is performed by using the first sound effect when the number of enemy characters eliminated simultaneously by a player is four or less. When the player simultaneously eliminates five or more enemy characters (a situation in which sound effects are simultaneously emitted from five or more sound source objects), sound output may be performed by using the second sound effect. In addition, when the second sound effect is used, calculation of a sound volume may be omitted.

(Second Embodiment)

Next, a second embodiment will be described with reference to FIGS. 12 to 17. In the above first embodiment, the case of a single virtual microphone has been described as an example. In contrast, in the second embodiment, a case of a plurality of virtual microphones will be described as an example. For example, the second embodiment is applicable to a case where, in a game process, a screen is split into two screens and a game is played simultaneously by two players. It is noted that a game system 1 according to the second embodiment is basically the same as that in the above first embodiment, except that a plurality of controllers 7 are used, and thus the same reference characters are used therefor and the detailed description thereof is omitted.

First, an outline of a game process assumed in the second embodiment will be described. A game assumed in the present embodiment is basically the same as that in the first embodiment, and is a game that allows a player character to freely move around in a virtual space. In the present embodiment, a case is assumed in which the screen is split into left-half and right-half screens, the screens are assigned to two players, respectively, and the game is played simultaneously by the two players. In this case, a virtual camera and a virtual microphone are provided for each split screen. In the present embodiment, since the screen is split into the left-half and right-half screens, two virtual cameras and two virtual microphones are used. A process of receiving, with each of these two virtual microphones, a sound emitted from a certain sound source object is performed, but the sounds received by the two virtual microphones are outputted as a single sound when being finally outputted to the speakers 2L and 2R. At that time, in the present embodiment, output that takes the split screens into consideration, namely, output that takes into consideration the positional relation between each of a plurality of the virtual microphones and the sound source object, is performed.

The above sound output that takes the split screens into consideration will be described briefly. For simplification of explanation, a case of only one sound source object within the virtual space will be described as an example. However, in the second embodiment, a case in which a plurality of sound source objects are present is assumed as described later.

Figure 12:
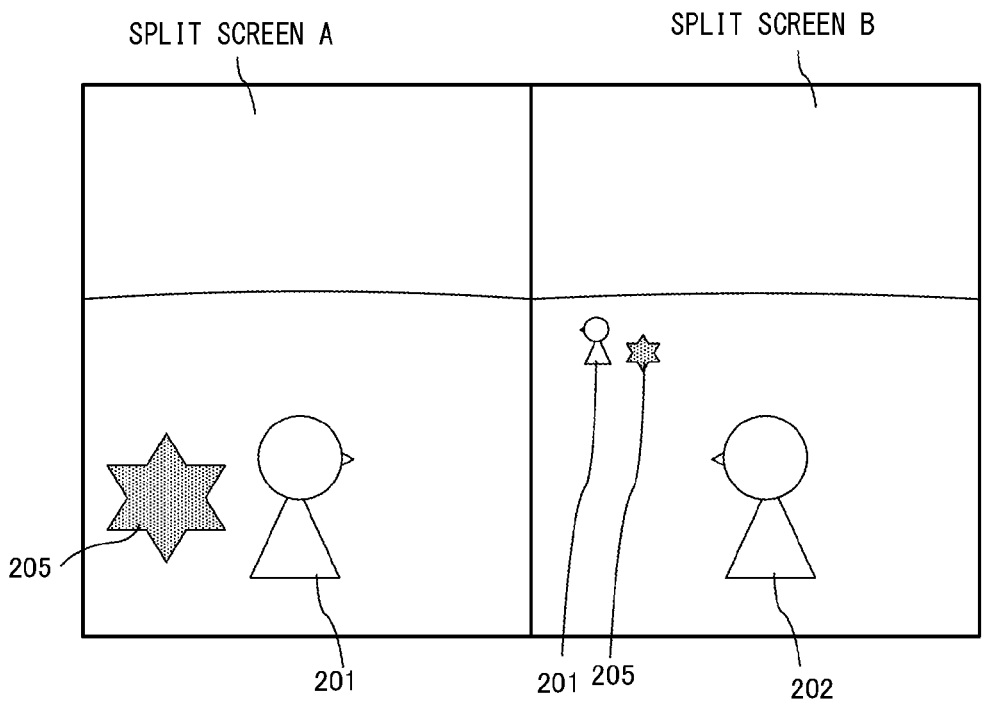
FIG. 12 shows a non-limiting example of a game screen in a second embodiment.

FIG. 12 is a diagram showing an example of a game screen for simultaneous play by two players through screen splitting. In FIG. 12, the screen is split into left-half and right-half screens with the center thereof as a boundary. In FIG. 12, the left-half screen is assigned as a screen for a first player (hereinafter, referred to as player A), and the right-half screen is assigned as a screen for a second player (hereinafter, referred to as player B).

A player character 201, which is an operation target of the player A, and a sound source object 205 are displayed on the screen for the player A (hereinafter, referred to as split screen A). In addition, the right side of the player character 201 is displayed on the split screen A. Moreover, the sound source object 205 is located on the left rear side of the player character 201. Meanwhile, a player character 202, which is an operation target of the player B, is displayed on the screen for the player B (hereinafter, referred to as split screen B). In addition, the player character 201 and the sound source object 205 are displayed (far from the player character 202). It is noted that the left side of the player character 202 is displayed on the split screen B.

Figure 13:
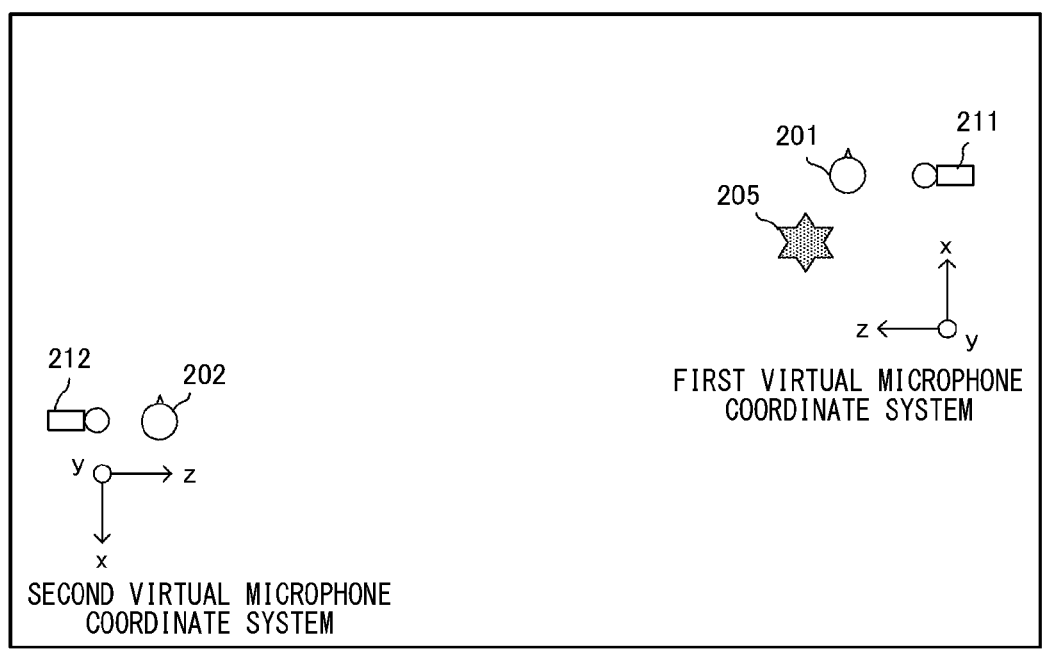
FIG. 13 is a diagram showing a positional relation of each object within a virtual space.

FIG. 13 is a diagram showing a positional relation of each object within the virtual space in the above-described state of FIG. 12. In addition, FIG. 13 shows a bird's eye view of the virtual space. In FIG. 13, both of the player characters 201 and 202 face in a z-axis positive direction in a virtual space coordinate system. In addition, a first virtual microphone 211 is located on the right side of the player character 201 in FIG. 13. Moreover, a first virtual camera (not shown) is also located at the same position as that of the first virtual microphone 211. An image captured by the first virtual camera is displayed on the split screen A. The first virtual microphone 211 is used for the split screen A. Similarly, a second virtual microphone 212 is located on the left side of the player character 202. In addition, a second virtual camera (not shown) is also located at this position. An image captured by the second virtual camera is displayed on the split screen B. The second virtual microphone 212 is used for the split screen B. It is noted that in principle, these virtual cameras and virtual microphones are moved in accordance with movement of each player character.

In FIG. 13, the player character 201 is located substantially at the upper right location in FIG. 13. Meanwhile, the player character 202 is located at a location near the lower left in FIG. 13. The sound source object 205 is located near (on the left rear side of) the player character 201. In other words, a positional relation is established in which the sound source object 205 is present nearby when being seen from the player character 201, and is present far when being seen from the player character 202.

In the above-described positional relation, a case will be considered in which a sound emitted from the sound source object 205 is represented (outputted) by the speakers 2L and 2R. In the present embodiment, the screen is split into two screens as described above, and the virtual microphone is provided for each screen. Thus, a process of receiving the sound from the sound source object 205 with each virtual microphone is performed. As a result, the sound emitted from the sound source object 205 reaches each virtual microphone with different sound volumes and localizations. Here, with regard to a physical speaker, only a pair of the speakers 2L and 2R is present in the present embodiment. Thus, in the present embodiment, the sounds of the sound source object 205 obtained by the two virtual microphones are eventually represented collectively as a single sound. In this case, in the present embodiment, sound representation is performed in such a manner that the positional relation between each player character and the sound source object 205 in each screen is reflected therein. Specifically, sound output is performed in such a manner that sound localization is biased to the split screen side associated with the virtual microphone closer to the sound source (the virtual microphone that picks up a louder sound). By so doing, the sound emitted from the sound source is allowed to be heard in a natural manner, even with a single sound without reproducing, as the sound from the sound source, sounds whose number is equal to the number of the split screens.

The principle of the above-described process that takes the split screens into consideration will be described. For the above-described process, a localization range is defined as follows. First, a localization range for the speakers 2L and 2R is defined as a range of −1.0 to 1.0, similarly to the above first embodiment. A localization corresponding to each split screen is defined. FIG. 14 shows an example of localization ranges that take the split screens into consideration. As shown in FIG. 14, a first localization range (−1.0 to 0.0) is defined for the split screen A, and a second localization range (0.0 to 1.0) is defined for the split screen B. Under such definition, the localization of a sound received by the first virtual microphone 211 is processed so as to fall within the first localization range, and the localization of a sound received by the second virtual microphone 212 is processed so as to fall within the second localization range. Then, a sound to be finally outputted from the speakers 2L and 2R is generated such that importance is placed on the received sound localization at the virtual microphone at which the received sound volume is greater.

Specifically, the following process is performed. First, the above-described received sound volume and received sound localization are calculated for each virtual microphone. The received sound localization is calculated on the assumption of the case of a single-screen case. That is, the received sound localization is calculated so as to fall within the range of −1.0 to 1.0.

Next, the received sound localization is corrected according to the split screen. In other words, with regard to the received sound localization at the first virtual microphone 211, a value calculated so as to fall within the range of −1.0 to 1.0 is corrected so as to be a value within the range of −1.0 to 0.0. Similarly, with regard to the received sound localization at the second virtual microphone 212, a value calculated so as to fall within the range of −1.0 to 1.0 is corrected so as to be a value within the range of 0.0 to 1.0. Hereinafter, the localization after the correction is referred to as splitting correction localization.

Next, a greater received sound volume among the received sound volumes at the first virtual microphone 211 and the second virtual microphone 212 is set as a sound volume for final sound output (hereinafter, referred to as splitting-considered sound volume). Furthermore, a localization that takes the split screens into consideration (hereinafter, splitting-considered localization) is calculated by using the following formula 2.

[Math. 2]

$$\frac{(MRSV1 \times CL1) + (MRSV2 \times CL2)}{MRSV1 + MRSV2} \quad \text{formula 2}$$

In this formula, MRSV (microphone received sound volume) n and CL (correction localization) n denote the received sound volume and the splitting correction localization, respectively, at the nth virtual microphone.

By so doing, in the screen state shown in FIG. 12, sound representation is performed such that the sound emitted by the sound source object 205 is heard mainly from the speaker 2L and is not heard from the speaker 2R. Thus, the player A can aurally recognize that the sound source object 205 is very close to the player character 201. The player B can aurally recognize that the sound source object 205 is not close to the player character 202.

When the screen is split and two players simultaneously play the game as described above, a process of calculating the splitting-considered sound volume and the splitting-considered localization, which take the split screens into consideration, is performed, and the sound from the sound source object 205 is outputted. In the second embodiment, such a process and a process of outputting sounds from a plurality of sound sources as a combined sound as described in the above first embodiment are used in combination. For example, a case of three sound source objects in a state of being the above split screens, namely, in a state of being two virtual microphones, is assumed. In this case, the splitting-considered sound volume and the splitting-considered localization are calculated for each sound source object. Then, a combined sound is generated on the basis of the splitting-considered sound volume and the splitting-considered localization regarding each sound source object. That is, the splitting-considered sound volume and the splitting-considered localization of each sound source are used as the "received sound volume n" and the "received sound localization n" of each sound source in the above formula 1. In other words, the localization of the combined sound is calculated by performing a calculation process with the above formula 1 using the values calculated previously by the above formula 2.

Figure 15:
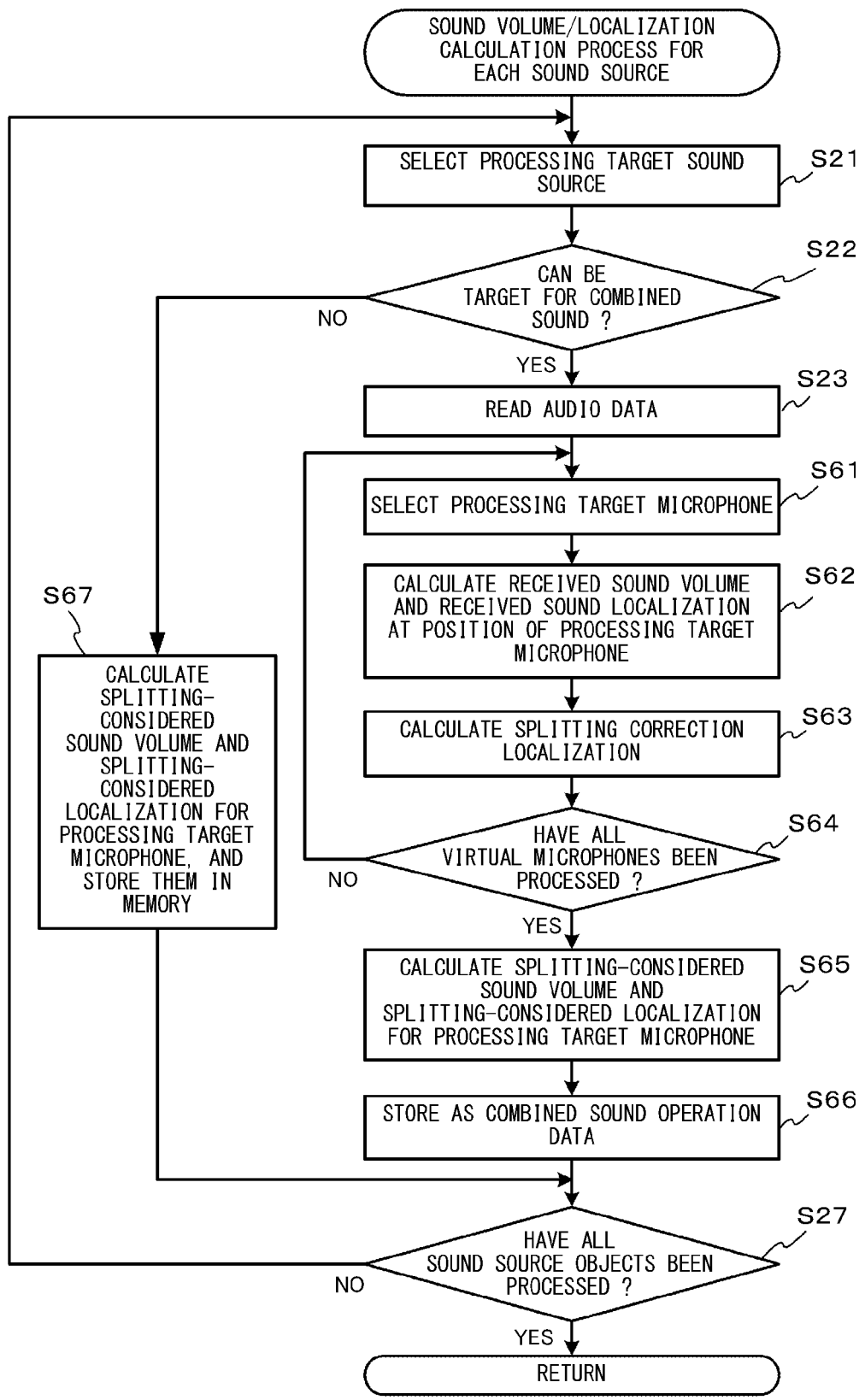
FIG. 15 is a flowchart showing a non-limiting example of a sound volume/localization calculation process for each sound source in the second embodiment.

Hereinafter, a specific example of the above process will be described with reference to FIG. 15. FIG. 15 is a flowchart of a process when values calculated previously by using the above formula 2 are substituted in the formula 1. It is noted that data to be used is basically the same as that in the first embodiment. However, since a plurality of virtual microphones are present, data required for the process, such as the virtual microphone attitude data 85 and the virtual microphone position data 86, is prepared as appropriate for each virtual microphone.

The process in FIG. 15 is performed as the sound volume/localization calculation process for each sound source described in the above first embodiment with reference to FIG. 10. A part of the content of the process is the same as the process shown in FIG. 10, and thus the same steps in both flowcharts are designated by the same reference characters.

In FIG. 15, first, the above-described processes in steps S21 to S23 are performed. Specifically, a processing target sound source is selected, and when the sound of the processing target sound source can be a target for a combined sound (YES in step S22, the game audio data 84 is read.

Next, in step S61, the CPU 11 selects one virtual microphone (hereinafter, referred to as processing target microphone) as a target of the processes in steps S62 to S64 described later. Since the case of two virtual microphones is described in the present embodiment, the first virtual microphone 211 is initially selected as a processing target microphone, and then the second virtual microphone 212 is selected.

Next, in step S62, the CPU 11 performs a process of receiving the sound of the processing target sound source with (at the position of) the processing target microphone and calculating the received sound volume and the above-described correction localization. Specifically, first, the CPU 11 calculates the received sound volume at the processing target microphone on the basis of the distance between the processing target sound source and the like. The sound volume is represented by a value within the range of 0.0 to 1.0. Next, the CPU 11 calculates the received sound localization of the processing target sound source in the same manner as that for the case where the screen is not split, namely, the game screen is displayed as a single screen, as described above. The calculated localization is a value within the range of −1.0 to 1.0.

Subsequently, in step S63, the CPU 11 performs correction of the localization in consideration of the split screens as described. In other words, the CPU 11 performs calculation of the above-described splitting correction localization. Thus, the received sound volume and the splitting correction localization at the processing target microphone are calculated.

Next, in step S64, the CPU 11 determines whether or not the above-described calculation of the received sound volume and the splitting correction localization has been performed for all the virtual microphones. As a result, when an unprocessed virtual microphone still remains (No in step S64), the CPU 11 returns to step S61 and repeats the same process.

On the other hand, when all the virtual microphones have been processed (YES in step S64), the CPU 11 calculates, in the subsequent step S65, the above-described splitting-considered sound volume and splitting-considered localization on the basis of the received sound volume and the splitting correction localization at each virtual microphone. Specifically, the CPU 11 sets, as the final output sound volume, a greater received sound volume among the received sound volumes at the first virtual microphone 211 and the second virtual microphone 212. Furthermore, the CPU 11 calculates the splitting-considered localization by using the above formula 2.

Next, in step S66, the CPU 11 stores the calculated splitting-considered sound volume and splitting-considered localization as the combined sound operation data 88.

On the other hand, as a result of the determination in step S22, when the processing target sound source does not become a target for a combined sound (No in step S22, the CPU 11, in step S67, calculates a received sound volume and a correction localization at each microphone as described above, and calculates a splitting-considered sound volume and a splitting-considered localization of the processing target sound source on the basis of the calculated received sound volumes and correction localizations. Then, the CPU 11 stores data representing the calculated splitting-considered sound volume and splitting-considered localization, in the memory 12 as appropriate. Then, the processing proceeds to step S27.

Next, in step S27, the CPU 11 determines whether or not the above-described process has been performed for all the sound source objects present within the virtual space. As a result, when unprocessed sound source objects still remain (NO in step S27), the CPU 11 returns to step S21 and repeats the same process. At that time, for the process in step S64, the state for each virtual microphone is reset from a "processed state" to an "unprocessed" state. On the other hand, when all the sound source objects have been processed (YES in step S27), the sound volume/localization calculation process for each sound source is ended. Then, the final sound volume/localization calculation process (step S2) and the output to the speaker (step S3) in the above first embodiment are performed (i.e., a calculation process with the above formula 1 using the result obtained by the above formula 2 is performed). At that time, in the above process in step S46, reproduction is performed on the basis of the splitting-considered sound volume and the splitting-considered localization stored in the memory in step S67. By so doing, a combined sound or the like that takes into consideration the localizations at the split screens is generated and outputted.

The order of the above process steps may be changed. Specifically, for each of the plurality of virtual microphones, a combined sound is calculated from sounds from three sound source objects by using the process (steps S1 and S2) described in the first embodiment. Then, the above-described splitting-considered sound volume and splitting-considered localization are calculated on the basis of the combined sound calculated for each virtual microphone. In other words, the localization of each combined sound is used as the received sound localization, and the splitting correction localization is calculated on the basis of these localizations. Then, the sound volume of each combined sound is used as the received sound volume, and the above formula 2 is used. In other words, the splitting-considered sound volume and the splitting-considered localization may be calculated by substituting, in the above formula 2, the values calculated previously by using the above formula 1.

Figure 16:
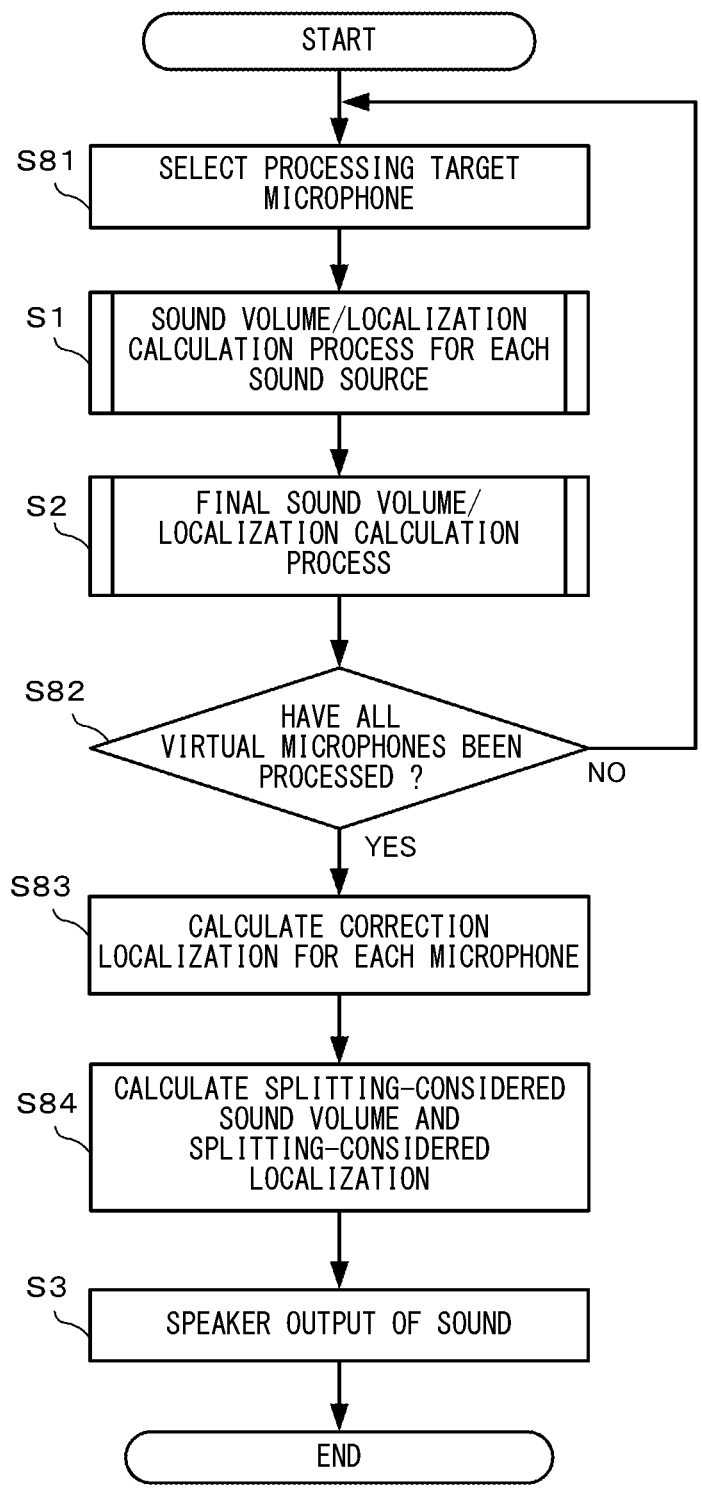
FIG. 16 is a flowchart showing another non-limiting example of a sound control process in the second embodiment.

FIG. 16 is a flowchart showing an example of a process when values calculated previously by using the above formula 1 are substituted in the above formula 2. In the process, first, in step S81, the CPU 11 selects one processing target microphone. Then, the processes (steps S1 and S2) described in the above first embodiment are performed, and a process for a sound regarding the processing target microphone (calculation of a combined sound, etc.) is performed.

In step S82, the CPU 11 determines whether or not the processes in steps S1 and S2 have been performed for all the virtual microphones. When an unprocessed virtual microphone still remains (NO in step S82), the CPU 11 returns to step S81 and repeats the same process. When all the virtual microphones have been processed (YES in step S82), the CPU 11 calculates the above correction localization for each virtual microphone in step S82. Next, in step S84, the CPU 11 performs calculation of the above splitting-considered sound volume. Specifically, the CPU 11 calculates the splitting-considered localization by using the above formula 2. Then, in step S3, the CPU 11 performs speaker output of a final sound on the basis of the splitting-considered sound volume and the splitting-considered localization. This is the end of the process regarding the flowchart of FIG. 16.

As described above, in the second embodiment, in the case where the screen is split and a virtual microphone corresponding to each split screen is provided, in addition to the process in the above first embodiment, the process of adjusting the sound volume and the localization in consideration of the split screens is also performed. By so doing, a sound volume is prevented from being unexpectedly great due to simultaneous reproduction of same sounds, and it is also possible to perform sound reproduction in consideration of the position of each sound source and the split screens.

In each of the above embodiments, the case of using the stereo speakers 2L and 2R provided at the left and right edges of the monitor 2 has been described as an example. In addition, for example, the above-described process is also applicable to a case where a 5.1 ch surround speaker is used instead of the speakers 2L and 2R of the monitor 2. In such a case, in addition to the localization in the x-axis direction in the local coordinate system for the virtual microphone as in the above-described process, a localization in the depth direction, namely, the z-axis direction in the local coordinate system for the virtual microphone may also be taken into consideration. For example, a localization range is set such that the position of a player is at 0.0, a range of 0.0 to 1.0 is set for the front of the player, and a range of −1.0 to 0.0 is set for the rear of the player. The localization may be two-dimensionally adjusted on an xz plane. In other words, sound output control may be performed by using both a localization in the x-axis direction and a localization in the z-axis direction.

In the above embodiment, when same sounds are reproduced at the same timing, these same sounds are made into a combined sound. In addition, the above-described process may be used for different sounds that are reproduced at the same timing. In this case, for example, for each of the different sounds, "group" definition may be previously made such that the sound is to be a target for "combined sound". For example, three sound source objects that emit different sounds are previously defined so as to belong to one group as a target for a combined sound. Then, when two or more sound source objects that belong to this group output the sounds at the same timing, the above-described process may be used, weight assignment may be performed with importance placed on the localization of the sound source having the greatest received sound volume at the position of the virtual microphone, and a localization of a sound to be finally outputted may be calculated. Alternatively, as a sound to be reproduced, only the sound of the sound source having the greatest received sound volume may be reproduced.

The game process program for performing the process according to the above embodiment can be stored in any computer-readable storage medium (e.g., a flexible disc, a hard disk, an optical disc, a magneto-optical disc, a CD-ROM, a CD-R, a magnetic tape, a semiconductor memory card, a ROM, a RAM, etc.).

In the above embodiment, the game process has been described as an example. However, the content of information processing is not limited to the game process, and the process according to the above embodiment is also applicable to other information processing in which a screen is split and a situation of a virtual three-dimensional space is displayed thereon.

In the above embodiment, a series of processes for controlling calculation of a localization and a sound volume of a sound to be finally outputted, on the basis of the positional relations between a certain single sound source object and a plurality of virtual microphones and sounds received by the virtual microphones, is performed in a single apparatus (the game apparatus body 5). In another embodiment, the series of processes may be performed in an information processing system that includes a plurality of information processing apparatuses. For example, in an information processing system that includes a game apparatus body 5 and a server side apparatus communicable with the game apparatus body 5 via a network, a part of the series of processes may be performed by the server side apparatus. Alternatively, in the information processing system, a server side system may include a plurality of information processing apparatuses, and a process to be performed in the server side system may be divided and performed by the plurality of information processing apparatuses.

What is claimed is:

1. A game system which includes a sound output device configured to output a sound based on an audio signal and which generates a virtual three-dimensional space in which at least one virtual microphone and a plurality of sound source objects each associated with audio data are located, the game system comprising a computer processor configured to perform at least:
    reproducing a sound based on the audio data associated with each of the plurality of sound source objects, at a position of each sound source object in the virtual three-dimensional space and at the same timing;
    calculating, for each sound source object, a magnitude of a sound volume of the reproduced sound of each sound source object, at the virtual microphone when each sound is received by the virtual microphone;
    calculating, for each sound source object, a localization of the reproduced sound of each sound source object, at the virtual microphone as a first localization when each sound is received by the virtual microphone;
    determining any one sound source object as a weight assignment target on the basis of the magnitude of the calculated sound volume of the sound of each sound source object;
    performing weight assignment such that the localization of the sound of the determined sound source object is more greatly reflected and calculating a second localization on the basis of the first localization of each sound source object when the sounds of the sound source objects are outputted as a single combined sound; and
    generating, on the basis of the second localization, an audio signal in which the sounds of the plurality of sound source objects are made into the single combined sound, and to output the audio signal to the sound output device, wherein
    the sound output device is a stereo speaker, and
    each of the first localization calculation and the second localization calculation calculates a localization in a right-left direction when a player facing the sound output device sees the sound output device.

2. The game system according to claim 1, wherein the audio data associated with the plurality of sound source objects is the same for each of the plurality of sound source objects.

3. The game system according to claim 1, wherein the determining determines, as the weight assignment target, the sound source object having the greatest magnitude of the sound volume of the reproduced sound.

4. The game system according to claim 1, the computer processor is further configured to perform setting a sound volume of a sound to be outputted to the sound output device, on the basis of the sound source objects that have emitted the sounds at the same timing, wherein
    the generating outputs a sound based on the audio signal with the set sound volume.

5. The game system according to claim 4, wherein the setting sets, as the sound volume of the sound to be outputted to the sound output device, the greatest sound volume among the sound volume of the sound of each calculated sound source object.

6. The game system according to claim 4, wherein the setting sets the sound volume of the sound to be outputted to the sound output device, on the basis of the number of the sound source objects that have emitted the sounds at the same timing.

7. The game system according to claim 6, wherein the setting sets the sound volume of the sound to be outputted, such that the sound volume is increased as the number of the sound source objects that have emitted the sounds at the same timing is increased.

8. The game system according to claim 1, the computer processor is further configured to perform changing a content of a sound to be outputted to the sound output device, on the basis of the number of the sound source objects that have emitted the sounds at the same timing.

9. The game system according to claim 1, wherein
    the sound output device is a surround speaker, and
    each of the first localization calculation and the second localization calculation calculates a localization in a right-left direction and a localization in a forward-rearward direction when a player facing the sound output device sees the sound output device.

10. The game system according to claim 1, wherein
    a plurality of virtual microphones are located in the virtual three-dimensional space,
    the calculating calculates the magnitude of the sound volume of the sound of each sound source object for each of the plurality of virtual microphones,
    the first localization calculation calculates the first localization of each sound source object for each of the plurality of virtual microphones,
    the determining determines the weight assignment target for each of the plurality of virtual microphones,
    the second localization calculation calculates the second localization for each of the plurality of virtual microphones,
    the computer processor is further configured to perform a calculating a localization with which the sounds received by each virtual microphone are to be outputted as a single combined sound, as a third localization on the basis of the second localization at each of the plurality of virtual microphones, and
    the generating generates an audio signal regarding the sound source objects on the basis of the third localization and outputs the audio signal to the sound output device.

11. A game system which includes a sound output device configured to output a sound based on an audio signal and which generates a virtual three-dimensional space in which a plurality of virtual microphones and a plurality of sound source objects each associated with audio data are located, the game system comprising a computer processor configured to perform at least:
    reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the magnitude of the calculated sound volume of the sound of each sound source object at each virtual microphone and the calculated first localization of each sound source object at each virtual microphone, the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and to output the audio signal to the sound output device wherein the sound output device is a stereo speaker, and each of the first localization calculation and the second localization calculation calculates a localization in a right-left direction when a player facing the sound output device sees the sound output device.

12. A game process control method for controlling a game system which includes a sound output device configured to output a sound based on an audio signal and a computer processor coupled to the sound output device, and which generates a virtual three-dimensional space in which at least one virtual microphone and a plurality of sound source objects each associated with audio data are located, the game process control method comprising the computer processor performing at least:

reproducing a sound based on the audio data associated with each of the plurality of sound source objects, at a position of each sound source object in the virtual three-dimensional space and at the same timing;

calculating, for each sound source object, a magnitude of a sound volume of the reproduced sound of each sound source object, at the virtual microphone when each sound is received by the virtual microphone;

calculating, for each sound source object, a localization of the reproduced sound of each sound source object, at the virtual microphone as a first localization when each sound is received by the virtual microphone;

determining any one sound source object as a weight assignment target on the basis of the magnitude of the calculated sound volume of the sound of each sound source object;

performing weight assignment such that the localization of the sound of the determined sound source object is more greatly reflected and calculating a second localization on the basis of the first localization of each sound source object when the sounds of the sound source objects are outputted as a single combined sound; and generating, on the basis of the second localization, an audio signal in which the sounds of the plurality of sound source objects are made into the single combined sound, and outputting the audio signal to the sound output device, wherein the sound output device is a stereo speaker, and each of the first localization calculation and the second localization calculation calculates a localization in a right-left direction when a player facing the sound output device sees the sound output device.

13. A game process control method for controlling a game system which includes a sound output device configured to output a sound based on an audio signal and a computer processor coupled to the sound output device, and which generates a virtual three-dimensional space in which a plurality of virtual microphones and a plurality of sound source objects each associated with audio data are located, the game process control method comprising the computer processor performing at least:

reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the magnitude of the calculated sound volume of the sound of each sound source object at each virtual microphone and the calculated first localization of each sound source object at each virtual microphone, the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and outputting the audio signal to the sound output device, wherein the sound output device is a stereo speaker, and each of the first localization calculation and the second localization calculation calculates a localization in a right-left direction when a player facing the sound output device sees the sound output device.

14. A game apparatus which includes a sound output device configured to output a sound based on an audio signal and which generates a virtual three-dimensional space in which at least one virtual microphone and a plurality of sound source objects each associated with audio data are located, the game apparatus comprising a computer processor configured to perform at least:

reproducing a sound based on the audio data associated with each of the plurality of sound source objects, at a position of each sound source object in the virtual three-dimensional space and at the same timing;

calculating, for each sound source object, a magnitude of a sound volume of the reproduced sound of each sound source object, at the virtual microphone when each sound is received by the virtual microphone;

calculating, for each sound source object, a localization of the reproduced sound of each sound source object, at the virtual microphone as a first localization when each sound is received by the virtual microphone;

determining any one sound source object as a weight assignment target on the basis of the magnitude of the calculated sound volume of the sound of each sound source object;

performing weight assignment such that the localization of the sound of the determined sound source object is more greatly reflected and calculating a second localization on the basis of the first localization of each sound source object when the sounds of the sound source objects are outputted as a single combined sound; and generating, on the basis of the second localization, an audio signal in which the sounds of the plurality of sound source objects are made into the single sound, and to output the audio signal to the sound output device, wherein the sound output device is a stereo speaker, and each of the first localization calculation and the second localization calculation calculates a localization in a right-left direction when a player facing the sound output device sees the sound output device.

15. A game apparatus which includes a sound output device configured to output a sound based on an audio signal and which generates a virtual three-dimensional space in which a plurality of virtual microphones and a plurality of sound source objects each associated with audio data are located, the game apparatus comprising a computer processor configured to perform at least:

reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the calculated magnitude of the sound volume of the sound of each sound source object at each virtual microphone and the calculated first localization of each sound source object at each virtual microphone the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and to output the audio signal to the sound output device, wherein the sound output device is a stereo speaker, and each of the first localization calculation and the second localization calculation calculates a localization in a right-left direction when a player facing the sound output device sees the sound output device.

16. A computer-readable non-transitory storage medium having stored therein a game program executed by a computer of a game system which includes a sound output device configured to output a sound based on an audio signal and which generates a virtual three-dimensional space in which at least one virtual microphone and a plurality of sound source objects each associated with audio data are located, the game program causing the computer to perform at least:

reproducing a sound based on the audio data associated with each of the plurality of sound source objects, at a position of each sound source object in the virtual three-dimensional space and at the same timing;

calculating, for each sound source object, a magnitude of a sound volume of the reproduced sound of each sound source object, at the virtual microphone when each sound is received by the virtual microphone;

calculating, for each sound source object, a localization of the reproduced sound of each sound source object, at the virtual microphone as a first localization when each sound is received by the virtual microphone;

determining any one sound source object as a weight assignment target on the basis of the magnitude of the calculated sound volume of the sound of each sound source object;

performing weight assignment such that the localization of the sound of the determined sound source object is more greatly reflected and to calculate a second localization on the basis of the first localization of each sound source object when the sounds of the sound source objects are outputted as a single combined sound; and generating, on the basis of the second localization, an audio signal in which the sounds of the plurality of sound source objects are made into a the single combined sound, and to output the audio signal to the sound output device, wherein the sound output device is a stereo speaker, and each of the first localization calculation and the second localization calculation calculates a localization in a right-left direction when a player facing the sound output device sees the sound output device.

17. A computer-readable non-transitory storage medium having stored therein a game program executed by a computer of a game system which includes a sound output device configured to output a sound based on an audio signal and which generates a virtual three-dimensional space in which a plurality of virtual microphones and a plurality of sound source objects each associated with audio data are located, the game program causing the computer to perform at least:

reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the calculated magnitude of the sound volume of the sound of each sound source object at each virtual microphone and the calculated first localization of each sound source object at each virtual microphone, the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and to output the audio signal to the sound output device, wherein the sound output device is a stereo speaker, and each of the first localization calculation and the second localization calculation calculates a localization in a right-left direction when a player facing the sound output device sees the sound output device.

18. A game system which includes a sound output device configured to output a sound based on an audio signal and which generates a virtual three-dimensional space in which at least one virtual microphone and a plurality of sound source objects each associated with audio data are located, the game system comprising a computer processor configured to perform at least:

reproducing a sound based on the audio data associated with each of the plurality of sound source objects, at a position of each sound source object in the virtual three-dimensional space and at the same timing;

calculating, for each sound source object, a magnitude of a sound volume of the reproduced sound of each sound source object, at the virtual microphone when each sound is received by the virtual microphone;

calculating, for each sound source object, a localization of the reproduced sound of each sound source object, at the virtual microphone as a first localization when each sound is received by the virtual microphone;

determining any one sound source object as a weight assignment target on the basis of the magnitude of the calculated sound volume of the sound of each sound source object;

performing weight assignment such that the localization of the sound of the determined sound source object is more greatly reflected and calculating a second localization on the basis of the first localization of each sound source object when the sounds of the sound source objects are outputted as a single combined sound; and generating, on the basis of the second localization, an audio signal in which the sounds of the plurality of sound source objects are made into the single combined sound, and to output the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

19. A game system which includes a sound output device configured to output a sound based on an audio signal and which generates a virtual three-dimensional space in which a plurality of virtual microphones and a plurality of sound source objects each associated with audio data are located, the game system comprising a computer processor configured to perform at least:

reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the magnitude of the sound volume of the calculated sound of each sound source object at each virtual microphone and the calculated first localization of each sound source object at each virtual microphone, the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and to output the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

20. A game process control method for controlling a game system which includes a sound output device configured to output a sound based on an audio signal and a computer processor coupled to the sound output device, and which generates a virtual three-dimensional space in which at least one virtual microphone and a plurality of sound source objects each associated with audio data are located, the game process control method comprising the computer processor performing at least:

reproducing a sound based on the audio data associated with each of the plurality of sound source objects, at a position of each sound source object in the virtual three-dimensional space and at the same timing;

calculating, for each sound source object, a magnitude of a sound volume of the reproduced sound of each sound source object, at the virtual microphone when each sound is received by the virtual microphone;

calculating, for each sound source object, a localization of the reproduced sound of each sound source object, at the virtual microphone as a first localization when each sound is received by the virtual microphone;

determining any one sound source object as a weight assignment target on the basis of the magnitude of the calculated sound volume of the sound of each sound source object;

performing weight assignment such that the localization of the sound of the determined sound source object is more greatly reflected and calculating a second localization on the basis of the first localization of each sound source object when the sounds of the sound source objects are outputted as a single combined sound; and generating, on the basis of the second localization, an audio signal in which the sounds of the plurality of sound source objects are made into the single combined sound, and outputting the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

21. A game process control method for controlling a game system which includes a sound output device configured to output a sound based on an audio signal and a computer processor coupled to the sound output device, and which generates a virtual three-dimensional space in which a plurality of virtual microphones and a plurality of sound source objects each associated with audio data are located, the game process control method comprising the computer processor performing at least:

reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the magnitude of the calculated sound volume of the sound of each sound source object at each virtual microphone and the calculated first localization of each sound source object at each virtual microphone, the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and outputting the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

22. A game apparatus which includes a sound output device configured to output a sound based on an audio signal and which generates a virtual three-dimensional space in which at least one virtual microphone and a plurality of sound source objects each associated with audio data are located, the game apparatus comprising a computer processor configured to perform at least:

reproducing a sound based on the audio data associated with each of the plurality of sound source objects, at a position of each sound source object in the virtual three-dimensional space and at the same timing;

calculating, for each sound source object, a magnitude of a sound volume of the reproduced sound of each sound source object, at the virtual microphone when each sound is received by the virtual microphone;

calculating, for each sound source object, a localization of the reproduced sound of each sound source object, at the virtual microphone as a first localization when each sound is received by the virtual microphone;

determining any one sound source object as a weight assignment target on the basis of the magnitude of the calculated sound volume of the sound of each sound source object;

performing weight assignment such that the localization of the sound of the determined sound source object is more greatly reflected and calculating a second localization on the basis of the first localization of each sound source object when the sounds of the sound source objects are outputted as a single combined sound; and generating, on the basis of the second localization, an audio signal in which the sounds of the plurality of sound source objects are made into the single sound, and to output the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

23. A game apparatus which includes a sound output device configured to output a sound based on an audio signal and which generates a virtual three-dimensional space in which a plurality of virtual microphones and a plurality of sound source objects each associated with audio data are located, the game apparatus comprising a computer processor configured to perform at least:

reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the calculated magnitude of the sound volume of the sound of each sound source object at each virtual microphone and the calculated first localization of each sound source object at each virtual microphone, the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and to output the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

24. A computer-readable non-transitory storage medium having stored therein a game program executed by a computer of a game system which includes a sound output device configured to output a sound based on an audio signal and which generates a virtual three-dimensional space in which at least one virtual microphone and a plurality of sound source objects each associated with audio data are located, the game program causing the computer to perform at least:

reproducing a sound based on the audio data associated with each of the plurality of sound source objects, at a position of each sound source object in the virtual three-dimensional space and at the same timing;

calculating, for each sound source object, a magnitude of a sound volume of the reproduced sound of each sound source object, at the virtual microphone when each sound is received by the virtual microphone;

calculating, for each sound source object, a localization of the reproduced sound of each sound source object, at the virtual microphone as a first localization when each sound is received by the virtual microphone;

determining any one sound source object as a weight assignment target on the basis of the magnitude of the calculated sound volume of the sound of each sound source object;

performing weight assignment such that the localization of the sound of the determined sound source object is more greatly reflected and to calculate a second localization on the basis of the first localization of each sound source object when the sounds of the sound source objects are outputted as a single combined sound; and generating, on the basis of the second localization, an audio signal in which the sounds of the plurality of sound source objects are made into the single combined sound, and to output the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

25. A computer-readable non-transitory storage medium having stored therein a game program executed by a computer of a game system which includes a sound output device configured to output a sound based on an audio signal and which generates a virtual three-dimensional space in which a plurality of virtual microphones and a plurality of sound source objects each associated with audio data are located, the game program causing the computer to perform at least:

reproducing a sound based on the audio data associated with each sound source object, at a position of each sound source object in the virtual three-dimensional space and at the same timing;

calculating, for each of the plurality of virtual microphones, a magnitude of a sound volume of each of a plurality of the reproduced sounds, at each virtual microphone when the sounds are received by each virtual microphone;

calculating, for each of the plurality of virtual microphones, a localization of each of the reproduced sounds, as a first localization when the sounds are received by each virtual microphone;

calculating, for each of the plurality of sound source objects, a second localization on the basis of the calculated magnitude of the sound volume of the sound of each sound source object at each virtual microphone and the calculated first localization of each sound source object at each virtual microphone, the second localization being a localization with which the sounds received by the plurality of virtual microphones are to be outputted as a single combined sound;

calculating a third localization on the basis of the second localization regarding each of the plurality of sound source objects, the third localization being a localization with which the reproduced sounds of the plurality of sound source objects at the same timing are to be outputted as the single combined sound; and generating an audio signal regarding the sounds of the plurality of sound source objects which are reproduced at the same timing, on the basis of the third localization and to output the audio signal to the sound output device, wherein the sound output device is a surround speaker, and each of the first localization calculation and the second localization calculation calculates a localization in a right-left direction and a localization in a forward-rearward direction when a player facing the sound output device sees the sound output device.

* * * * *